(12) United States Patent
Inaba et al.

(10) Patent No.: US 10,435,327 B2
(45) Date of Patent: Oct. 8, 2019

(54) GLASS ARTICLE

(71) Applicant: ASAHI GLASS COMPANY, LIMITED, Chiyoda-ku (JP)

(72) Inventors: Seiji Inaba, Tokyo (JP); Yusuke Arai, Tokyo (JP); Hiroyuki Hijiya, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 85 days.

(21) Appl. No.: 15/722,611

(22) Filed: Oct. 2, 2017

(65) Prior Publication Data

US 2018/0050953 A1 Feb. 22, 2018

Related U.S. Application Data

(63) Continuation of application No. PCT/JP2016/060951, filed on Apr. 1, 2016.

(30) Foreign Application Priority Data

Apr. 3, 2015 (JP) ................................. 2015-077046

(51) Int. Cl.
| | | |
|---|---|---|
| $C03C\ 3/087$ | (2006.01) | |
| $C03C\ 3/095$ | (2006.01) | |
| $C03C\ 3/085$ | (2006.01) | |
| $C03C\ 3/091$ | (2006.01) | |
| $C03C\ 4/00$ | (2006.01) | |
| $C03C\ 3/093$ | (2006.01) | |

(52) U.S. Cl.
CPC .............. $C03C\ 3/095$ (2013.01); $C03C\ 3/085$ (2013.01); $C03C\ 3/087$ (2013.01); $C03C\ 3/091$ (2013.01); $C03C\ 3/093$ (2013.01); $C03C\ 4/0092$ (2013.01)

(58) Field of Classification Search
CPC .......... C03C 3/085; C03C 3/087; C03C 3/095
See application file for complete search history.

(56) References Cited

U.S. PATENT DOCUMENTS

| | | |
|---|---|---|
| 2003/0114291 A1 | 6/2003 | Koyama et al. |
| 2003/0125188 A1 | 7/2003 | Koyama et al. |
| 2003/0144126 A1 | 7/2003 | Kitayama et al. |
| 2003/0184211 A1 | 10/2003 | Hueber et al. |
| 2004/0157722 A1 | 8/2004 | Koyama et al. |
| 2004/0162212 A1 | 8/2004 | Koyama et al. |
| 2007/0213195 A1 | 9/2007 | Hikata et al. |
| 2010/0126218 A1 | 5/2010 | Shelestak et al. |
| 2013/0038940 A1 | 2/2013 | Shelestak et al. |

FOREIGN PATENT DOCUMENTS

| | | |
|---|---|---|
| JP | 2003-160354 | 6/2003 |
| JP | 2003-327446 | 11/2003 |
| JP | 2005-320225 | 11/2005 |
| JP | 2012-509246 | 4/2012 |
| JP | 2013-151428 | 8/2013 |
| WO | WO 01/66477 A1 | 9/2001 |
| WO | WO 01/68545 A1 | 9/2001 |

OTHER PUBLICATIONS

International Search Report dated Jun. 21, 2016 in PCT/JP2016/060951 filed Apr. 1, 2016 (with English Translation).
Written Opinion dated Jun. 21, 2016 in PCT/JP2016/060951 filed Apr. 1, 2016.

*Primary Examiner* — Elizabeth A. Bolden
(74) *Attorney, Agent, or Firm* — Oblon, McClelland, Maier & Neustadt, L.L.P.

(57) ABSTRACT

The present invention relates to a glass article having high transmittance, while suppressing the discoloration and the solarization of the glass. The glass article is provided by controlling the contents of cerium oxide and iron oxide in the glass composition within the optimum range, further controlling the contents of manganese oxide and iron oxide in the glass composition within the optimum range, and controlling the basicity of the alkaline earth metal oxides in the glass composition depending on the iron amount contained in the glass.

8 Claims, 1 Drawing Sheet

GLASS ARTICLE

TECHNICAL FIELD

The present invention relates to a glass article suppressed in solarization and discoloration and having a high transmittance in a visible light region.

BACKGROUND ART

Acrylic plates have been widely used in edge light type surface light emitter devices, for example, light guide body units of liquid crystal televisions. However, from the viewpoints of rigidity, heat resistance and water resistance, replacement to glass plates has been studied.

When the glass plate is applied to the light guide body, light absorption of the inside of the glass plate in a visible light region (wavelength: 380 to 780 nm) cannot be negligible as an optical path length becomes longer by an increase in size of a screen, and a problem of a reduction in luminance or occurrence of in-plane luminance/color unevenness is assumed. In addition, it is also considered that even a small amount of foam defects in the inside of the glass plate largely deteriorate product properties.

Regardless of the above-mentioned application, a glass article having a high transmittance in the visible light region has been required to suppress both solarization and discoloration, in addition to the problem as described above.

Patent Documents 1 to 3 each disclose glass having a high transmittance in the visible light region.

BACKGROUND ART DOCUMENT

Patent Document

Patent Document 1: JP-A-2003-160354
Patent Document 2: JP-A-2003-327446
Patent Document 3: JP-A-2005-320225

SUMMARY OF THE INVENTION

Problems that the Invention is to Solve

An object of the present invention is to provide a glass article having a high transmittance in a visible light region while suppressing discoloration and solarization of glass.

In the present invention, the discoloration of glass indicates absorption of the glass in an initial state before strong light is irradiated from an ultraviolet region, and the solarization indicates absorption newly generated by irradiation of light to the glass.

Means for Solving the Problems

The present invention is obtained based on the above findings and provides glass articles having configurations described in the following [1]-[6].
[1] A glass article including a glass containing, in terms of mass % or mass ppm on the basis of the following oxides, 50 to 80% of $SiO_2$, 0 to 10% of $K_2O$, 1 to 145 ppm of total iron oxide (t-$Fe_2O_3$) in terms of $Fe_2O_3$, 0 to 30 ppm of ferrous iron ($Fe^{2+}$) in terms of $Fe_2O_3$, 1 to 1000 ppm of total cerium oxide (t-$CeO_2$) in terms of $CeO_2$, and 7.2 to 35% of at least one selected from the group consisting of alkaline earth metal oxides of MgO, CaO, SrO and BaO, in a total amount thereof,
in which, in the glass, redox of iron represented by the following formula (1) is from 0 to 30%:

(Content of ferrous iron ($Fe^{2+}$) in terms of $Fe_2O_3$)/
[(total content ($Fe^{2+}$+$Fe^{3+}$) of ferrous iron
($Fe^{2+}$) and ferric iron ($Fe^{3+}$) in terms of $Fe_2O_3$]   formula (1), and the glass satisfies relational formulae of the following formulae (2) and (3):

$$1 \le [t\text{-}CeO_2]/[t\text{-}Fe_2O_3] \le 45 \quad \text{formula (2)},$$

$$(64 \times [MgO] + 100 \times [CaO] + 127 \times [SrO] + 156 \times [BaO]) \ge 1200 \quad \text{formula (3)},$$

in which, in formula (2) and formula (3), [t-$CeO_2$] is the content (mass ppm) of the total cerium oxide, [t-$Fe_2O_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.
[2] A glass article including a glass containing, in terms of mass % or mass ppm on the basis of the following oxides, 50 to 80% of $SiO_2$, 0 to 10% of $K_2O$, 1 to 80 ppm of total iron oxide (t-$Fe_2O_3$) in terms of $Fe_2O_3$, 0 to 10 ppm of ferrous iron ($Fe^{2+}$) in terms of $Fe_2O_3$, 1 to 1000 ppm of total cerium oxide (t-$CeO_2$) in terms of $CeO_2$, and 7.2 to 35% of at least one selected from the group consisting of alkaline earth metal oxides of MgO, CaO, SrO and BaO, in a total amount thereof,
in which, in the glass, redox of iron presented by the following formula (1) is from 0 to 30%:

(Content of ferrous iron ($Fe^{2+}$) in terms of $Fe_2O_3$)/
[(total content ($Fe^{2+}$+$Fe^{3+}$) of ferrous iron
($Fe^{2+}$) and ferric iron ($Fe^{3+}$) in terms of $Fe_2O_3$]   formula (1), and the glass satisfies relational formulae of the following formulae (2) and (4):

$$1 \le [t\text{-}CeO_2]/[t\text{-}Fe_2O_3] \le 45 \quad \text{formula (2)},$$

$$(64 \times [MgO] + 100 \times [CaO] + 127 \times [SrO] + 156 \times [BaO]) \ge 1000 \quad \text{formula (4)},$$

in which, in formula (2) and formula (4), [t-$CeO_2$] is the content (mass ppm) of the total cerium oxide, [t-$Fe_2O_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.
[3] A glass article including a glass containing, in terms of mass % or mass ppm on the basis of the following oxides, 50 to 80% of $SiO_2$, 0 to 10% of $K_2O$, 1 to 145 ppm of total iron oxide (t-$Fe_2O_3$) in terms of $Fe_2O_3$, 0 to 30 ppm of ferrous iron ($Fe^{2+}$) in terms of $Fe_2O_3$, 1 to 1000 ppm of total cerium oxide (t-$CeO_2$) in terms of $CeO_2$, and 1 to 35% of at least one selected from the group consisting of alkaline earth metal oxides of MgO, CaO, SrO and BaO, in a total amount thereof,
in which, in the glass, redox of iron represented by the following formula (1) is from 0 to 30%:

(Content of ferrous iron ($Fe^{2+}$) in terms of $Fe_2O_3$)/
[(total content ($Fe^{2+}$+$Fe^{3+}$) of ferrous iron
($Fe^{2+}$) and ferric iron ($Fe^{3+}$) in terms of $Fe_2O_3$]   formula (1), and the glass satisfies relational formulae of the following formulae (2) and (3):

$$1 \le [t\text{-}CeO_2]/[t\text{-}Fe_2O_3] \le 45 \quad \text{formula (2)},$$

$$(64 \times [MgO] + 100 \times [CaO] + 127 \times [SrO] + 156 \times [BaO]) \ge 1200 \quad \text{formula (3)},$$

in which, in formula (2) and formula (3), [t-CeO$_2$] is the content (mass ppm) of the total cerium oxide, [t-Fe$_2$O$_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.

[4] A glass article including a glass containing, in terms of mass % or mass ppm on the basis of the following oxides, 50 to 80% of SiO$_2$, 0 to 10% of K$_2$O, 1 to 80 ppm of total iron oxide (t-Fe$_2$O$_3$) in terms of Fe$_2$O$_3$, 0 to 10 ppm of ferrous iron (Fe$^{2+}$) in terms of Fe$_2$O$_3$, 1 to 1000 ppm of total cerium oxide (t-CeO$_2$) in terms of CeO$_2$, and 1 to 35% of at least one selected from the group consisting of alkaline earth metal oxides of MgO, CaO, SrO and BaO, in a total amount thereof, in which, in the glass, redox of iron represented by the following formula (1) is from 0 to 30%:

(Content of ferrous iron (Fe$^{2+}$) in terms of Fe$_2$O$_3$)/
[(total content (Fe$^{2+}$+Fe$^{3+}$) of ferrous iron
(Fe$^{2+}$) and ferric iron (Fe$^{3+}$) in terms of Fe$_2$O$_3$]    formula (1), and the glass satisfies relational formulae of the following formulae (2) and (4):

1≤[t-CeO$_2$]/[t-Fe$_2$O$_3$]≤45    formula (2), (64×[MgO]+100×[CaO]+127×[SrO]+156×[BaO])≥
1000    formula (4), in which, in formula (2) and formula (4), [t-CeO$_2$] is the content (mass ppm) of the total cerium oxide, [t-Fe$_2$O$_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.

[5] A glass article including a glass containing, in terms of mass % or mass ppm on the basis of the following oxides, 50 to 80% of SiO$_2$, 0 to 10% of K$_2$O, 1 to 145 ppm of total iron oxide (t-Fe$_2$O$_3$) in terms of Fe$_2$O$_3$, 0 to 30 ppm of ferrous iron (Fe$^{2+}$) in terms of Fe$_2$O$_3$, 0.01 to 5 ppm of total manganese oxide (t-MnO$_2$) in terms of MnO$_2$, and 1 to 35% of at least one selected from the group consisting of alkaline earth metal oxides of MgO, CaO, SrO and BaO, in a total amount thereof, in which, in the glass, redox of iron represented by the following formula (1) is from 0 to 30%:

(Content of ferrous iron (Fe$^{2+}$) in terms of Fe$_2$O$_3$)/
[(total content (Fe$^{2+}$+Fe$^{3+}$) of ferrous iron
(Fe$^{2+}$) and ferric iron (Fe$^{3+}$) in terms of Fe$_2$O$_3$]    formula (1), and the glass satisfies relational formulae of the following formulae (5), (6) and (7):

[t-CeO$_2$]/[t-Fe$_2$O$_3$]<1    formula (5), 0.001≤[t-MnO$_2$]/[t-Fe$_2$O$_3$]≤0.5    formula (6), 80≤(64×[MgO]+100×[CaO]+127×[SrO]+156×
[BaO])≤ 3000    formula (7), in which, in formulae (5), (6) and (7), [t-CeO$_2$] is the content (mass ppm) of the total cerium oxide, [t-MnO$_2$] is the content (mass ppm) of the total manganese oxide, [t-Fe$_2$O$_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.

[6] A glass article including a glass containing, in terms of mass % or mass ppm on the basis of the following oxides, 50 to 80% of SiO$_2$, 0 to 10% of K$_2$O, 1 to 80 ppm of total iron oxide (t-Fe$_2$O$_3$) in terms of Fe$_2$O$_3$, 0 to 10 ppm of ferrous iron (Fe$^{2+}$) in terms of Fe$_2$O$_3$, 0.01 to 5 ppm of total manganese oxide (t-MnO$_2$) in terms of MnO$_2$, and 1 to 35% of at least one selected from the group consisting of alkaline earth metal oxides of MgO, CaO, SrO and BaO, in a total amount thereof, in which, in the glass, redox of iron represented by the following formula (1) is from 0 to 30%:

(Content of ferrous iron (Fe$^{2+}$) in terms of Fe$_2$O$_3$)/
[(total content (Fe$^{2+}$+Fe$^{3+}$) of ferrous iron
(Fe$^{2+}$) and ferric iron (Fe$^{3+}$) in terms of Fe$_2$O$_3$]    formula (1), and the glass satisfies relational formulae of the following formulae (5), (6) and (8):

[t-CeO$_2$]/[t-Fe$_2$O$_3$]<1    formula (5), 0.001≤[t-MnO$_2$]/[t-Fe$_2$O$_3$]≤0.5    formula (6), 80≤(64×[MgO]+100×[CaO]+127×[SrO]+156×
[BaO])≤ 2500    formula (8), in which, in formulae (5), (6) and (8), [t-CeO$_2$] is the content (mass ppm) of the total cerium oxide, [t-MnO$_2$] is the content (mass ppm) of the total manganese oxide, [t-Fe$_2$O$_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.

[7] A glass article including a glass comprising 50 to 80% of SiO$_2$, 0 to 10% of K$_2$O, 1 to 145 ppm of total iron oxide (t-Fe$_2$O$_3$) in terms of Fe$_2$O$_3$, and 0 to 30 ppm of ferrous iron (Fe$^{2+}$) in terms of Fe$_2$O$_3$, in which, in the glass, the redox of iron represented by the following formula (1) is from 0 to 30%:

(Content of ferrous iron (Fe$^{2+}$) in terms of Fe$_2$O$_3$)/
[(total content (Fe$^{2+}$+Fe$^{3+}$) of ferrous iron
(Fe$^{2+}$) and ferric iron (Fe$^{3+}$) in terms of Fe$_2$O$_3$]    formula (1), and the glass has 85% or more of a minimum value of a transmittance within a range of wavelengths from 400 to 700 nm under conditions of an effective optical path length of 50 mm, and 1.5% or less of a change amount Δ% T@400 nm in a transmittance at a wavelength of 400 nm and an optical path length of 1 mm before and after irradiation, when irradiated with a high-pressure mercury lamp having an illuminance of 45 mW/cm$^2$ for 30 seconds.

[8] The glass article according to any one of [1] to [4], in which, in the glass, a total of peak intensities of two light absorption peaks caused by Ce$^{3+}$, which are present between wavelengths of 260 nm and 360 nm, is 5.0 cm$^1$ or less.

[9] The glass article according to any one of [1] to [6], in which the glass has 85% or more of a minimum value of the transmittance within a range of wavelengths from 400 to 700 nm under conditions of an effective optical path length of 50 mm, and the difference between a maximum value and the minimum value of the transmittance is 3.8% or less.

[10] The glass article according to any one of [1] to [6], in which the glass has 1.5% or less of a change amount Δ % T@400 nm in a transmittance at a wavelength of 400 nm and an optical path length of 1 mm before and after irradiation, when irradiated with a high-pressure mercury lamp having an illuminance of 45 mW/cm$^2$ for 30 seconds.

[11] The glass article according to any one of [1] to [6], in which the glass has 5.0% or less of a change amount Δ% T@630 nm in a transmittance at a wavelength of 630 nm and an optical path length of 50 mm before and after irradiation, when irradiated with a white LED at an illuminance of 1,000,000 lux for 1,000 hours, which emits light within a range of wavelengths from 390 to 800 nm, has a peak of light emission within a range of wavelengths from 440 to 450 nm and has a color temperature of 6,500 K.

Advantage of the Invention

According to the present invention, it is possible to provide a glass article which has a high transmittance and can be suitably used in a light guide body, while suppressing discoloration and solarization of glass. The glass article of the present invention is suitable for architectural interior and exterior applications, solar cell cover glass, cover glass and substrate glass applications, exterior applications of various electronic devices, and light source applications of electronic devices, in which a high transmittance is desired, and particularly, suitable for light guide bodies of edge light type surface light emitter devices.

MODE FOR CARRYING OUT THE INVENTION

The present invention has been obtained based on the following facts, findings and considerations.

A main factor of light absorption of a glass plate is iron ions contained as impurities. Iron is unavoidably contained as a raw material of industrially manufactured glass, and the inclusion of iron into the glass is unavoidable. The iron ions take the forms of bivalence ($Fe^{2+}$) and trivalence ($Fe^{3+}$) in the glass. What is especially a problem is $Fe^{2+}$ having wide absorption at a wavelength of 490 to 780 nm. Although $Fe^{3+}$ has an absorption band at a wavelength of 380 to 490 nm, the absorption coefficient of $Fe^{3+}$ per unit concentration is low by one digit compared with that of $Fe^{2+}$ and thus its effect is small. Accordingly, in order to decrease light absorption in a visible region, it is necessary to devise so as to decrease the ratio of the $Fe^{2+}$ amount to the total iron ion amount as low as possible, that is, so as to decrease redox of iron.

In the industrially manufactured glass plate, in order for the transmittance of the glass plate to achieve the same level as that of an acrylic plate, the total of the iron contents contained as impurities should be decreased, however, there are many constraint conditions in terms of production, raw materials and the like.

In order to increase the transmittance of the glass plate to the same level as that of the acrylic plate within an allowable iron content range, it is essential to decrease the redox of iron more than the conventional one. In order to decrease the redox of iron, it is effective to add an oxidizing agent. Antimony oxide ($Sb_2O_3$) is generally used for production of plate glass, however, it causes a problem of discoloration in a float bath and has a heavy burden on environment. It is therefore preferred to avoid the use thereof. Cerium oxide ($CeO_2$) does not cause these problems, however, due to its weak oxidizing power, it has been necessary to increase the amount to be added in an actual glass melting furnace. However, when the amount of cerium oxide to be added is increased, absorption of visible light in a short wavelength region on the ultraviolet region side is increased, resulting in the occurrence of discoloration or solarization, which practically causes a problem. It is therefore desired to realize ways for more efficiently using cerium oxide as the oxidizing agent.

In addition, in order to decrease the redox of iron, there is a way of increasing the oxygen concentration in a furnace atmosphere more than the conventional one. In this case, cerium oxide as the oxidizing agent is not added, so that the discoloration or solarization due to cerium oxide is not dominant. Instead, the solarization caused by manganese oxide ($MnO_2$) contained as an impurity in the glass plate becomes prominent. Manganese oxide reacts with an iron ion to cause the solarization by irradiating glass with ultraviolet rays or strong visible light. When the total cerium oxide content is equivalent to or more than the total iron oxide content, the solarization caused by cerium oxide prevailingly proceeds. Accordingly, the solarization caused by manganese oxide is suppressed. Contrarily, when cerium oxide is not present, the solarization caused by manganese oxide prevailingly proceeds. Accordingly, it is desired to take measures thereto.

In addition, when adoption of the glass plate as a light guide body of an edge light type surface light emitter device is considered, it is important that the discoloration and the solarization are suppressed, that the minimum value of the internal transmittance of the glass plate in the whole wavelength region of wavelengths from 400 to 700 nm under conditions of an optical path length of 200 mm is 80% or more, that the transmittance is so high that the difference between the maximum value and the minimum value of the internal transmittance is 15% or less, and that an internal transmittance spectrum of the glass plate is more flattened.

As a result of studies based on the above-mentioned background, the present inventors have found that when cerium oxide is added as the oxidizing agent, by controlling the total iron oxide amount in terms of $Fe_2O_3$ contained in the glass, the redox of iron, the content of total cerium oxide and the ratio thereof, and further selecting such a suitable glass composition that cerium oxide effectively acts as the oxidizing agent, lower redox than that of the conventional glass can be achieved while suppressing the discoloration and the solarization of the glass. The present invention is thus reached.

In addition, it has been found that when the content of total cerium oxide is small compared with the content of total iron oxide or substantially none of cerium oxide is contained, by controlling the total iron oxide amount contained in the glass, the redox of iron, the content of total manganese oxide and the ratio thereof, and further selecting such a glass composition that an increase in the oxygen concentration in the furnace atmosphere effectively works on a decrease in the redox of iron, lower redox than that of the conventional glass can be achieved while suppressing the discoloration and the solarization of the glass. The present invention is thus reached.

Conventionally, when high transmittance glass is produced by using cerium oxide as the oxidizing agent for glass having a low environmental burden, it has been necessary to add a large amount of cerium oxide in order to realize the decreased redox. As a result, the solarization or the discoloration in the visible light short wavelength region has become a problem. According to the present invention, however, the glass article having a high transmittance, particularly the glass article having such a high transmittance that the average internal transmittance in the visible light region is 80% or more and having an internal transmittance spectrum more flattened, while suppressing the discoloration and solarization of the glass, can be provided by controlling the contents of cerium oxide and iron oxide in the glass composition, the ratio thereof and the like in the optimum ranges and selecting the suitable glass composition.

In addition, conventionally, when intending to prepare high transmittance glass in which the content of total cerium oxide is small compared with the content of total iron oxide or substantially none of cerium oxide is contained, the solarization of the glass has become significant by manganese oxide ($MnO_2$) contained as the impurity. According to the present invention, however, the glass article having a high transmittance, particularly the glass article having such a high transmittance that the average internal transmittance in the visible light region is 80% or more and having an internal transmittance spectrum more flattened, while suppressing the discoloration and the solarization of the glass, can be provided by controlling the contents of manganese oxide and iron oxide in the glass composition, the ratio thereof and the like in the optimum ranges and selecting the suitable glass composition.

In the present description, the glass article is a general term for tabular glass plates having a predetermined thickness, curved glass plates, glass rods, glass cylindrical tubes and other various glass articles. The most typical glass article in the present invention is the glass plate.

Further, in the present description, the glass component is represented in terms of an oxide such as $SiO_2$ or $Al_2O_3$, and the content of each component to the whole glass (the glass composition) is represented in terms of mass % or mass ppm on the basis of oxides (mass % is sometimes simply written as %, and mass ppm is sometimes simply written as ppm).

In addition, in the present description, "to" indicating a numerical value range is used in the meaning including numerical values described before and after it, as the lower limit value and the upper limit value, and hereinafter in the present description, "to" is used in the same meaning, unless otherwise specified.

The glass article of the present invention will be described below in detail.

The glass article includes a glass containing, in terms of mass % or mass ppm on the basis of oxides, 50 to 80% of $SiO_2$, 0 to 10% of $K_2O$, 1 to 145 ppm of total iron oxide (t-$Fe_2O_3$) in terms of $Fe_2O_3$, 0 to 30 ppm of ferrous iron ($Fe^{2+}$) in terms of $Fe_2O_3$, 1 to 1000 ppm of total cerium oxide (t-$CeO_2$) in terms of $CeO_2$, and 1 to 35%, preferably 7.2 to 35%, of at least one selected from the group consisting of alkaline earth metal oxides of MgO, CaO, SrO and BaO, in the total amount thereof.

Alternatively, the glass article includes a glass containing, in terms of mass % or mass ppm on the basis of oxides, 50 to 80% of $SiO_2$, 0 to 10% of $K_2O$, 1 to 145 ppm of total iron oxide (t-$Fe_2O_3$) in terms of $Fe_2O_3$, 0 to 30 ppm of ferrous iron ($Fe^2$) in terms of $Fe_2O_3$, 0.01 to 5 ppm of total manganese oxide in terms of $MnO_2$, and 1 to 35% of at least one selected from the group consisting of alkaline earth metal oxides of MgO, CaO, SrO and BaO, in the total amount thereof.

The content of total iron oxide (t-$Fe_2O_3$) in terms of $Fe_2O_3$ is 145 ppm or less in order to satisfy spectral properties and suppress an influence of the solarization. It is preferably 100 ppm or less, and more preferably 80 ppm or less. In particular, it has been found that 80 ppm or less of t-$Fe_2O_3$ is suitable for realizing an extremely high transmittance over the whole visible region. The content of t-$Fe_2O_3$ is more preferably 60 ppm or less, particularly preferably 45 ppm or less, and most preferably 35 ppm or less.

On the other hand, the total iron oxide content of the glass of the present invention is 1 ppm or more. When it is less than 1 ppm, it becomes difficult to improve meltability of glass at the time of production of multi-component oxide glass and to achieve mass production at low cost. In addition, it is difficult to obtain the raw material. It is preferably 5 ppm or more, more preferably 8 ppm or more, and still more preferably 10 ppm or more. The total iron oxide content of the glass can be adjusted by the amount of the iron component added at the time of the glass production.

In addition, the redox of iron in the glass of the present invention is within a range of 0 to 30%. The redox of iron is represented by the following formula (1):

(Content of ferrous iron ($Fe^{2+}$) in terms of $Fe_2O_3$)/ [(total content ($Fe^{2+}+Fe^{3+}$) of ferrous iron ($Fe^{2+}$) and ferric iron ($Fe^{3+}$) in terms of $Fe_2O_3$]   formula (1)

In the present invention, the total iron oxide content of the glass of the glass article is represented as the amount of $Fe_2O_3$. However, not all iron present in the glass is present as $Fe^{3+}$ (ferric iron). Usually, $Fe^{3+}$ and $Fe^{2+}$ (ferrous iron) are concurrently present in the glass. Although $Fe^{2+}$ and $Fe^{3+}$ have absorption in the visible light region, the absorption coefficient (11 $cm^{-1}$ $Mol^{-1}$) of $Fe^{2+}$ is larger by one digit than the absorption coefficient (0.96 $cm^{-1}$ $Mol^{-1}$) of $Fe^{3+}$, and thus $Fe^{2+}$ more decreases the internal transmittance in the visible light region. Thus, less content of $Fe^{2+}$ is preferred for increasing the internal transmittance in the visible light region.

In the glass of the present invention, the content of ferrous iron ($Fe^{2+}$) in terms of mass ppm in terms of $Fe_2O_3$ is from 0 to 30 ppm. The ferrous iron amount in terms of mass ppm in terms of $Fe_2O_3$ is preferably 10 ppm or less, more preferably 8 ppm or less, still more preferably 4.5 ppm or less, yet still more preferably 4 ppm or less, and particularly preferably 3.5 ppm or less.

On the other hand, since the effect of absorption due to $Fe^{3+}$ is also not negligible, in the glass of the present invention, the ferric iron amount in terms of mass ppm in terms of $Fe_2O_3$ is preferably 125 ppm or less. It is more preferably 45 ppm or less, and still more preferably 35 ppm or less.

Furthermore, in the glass of the glass article of the present invention, when the ratio of the content of $Fe^{2'}$ in terms of $Fe_2O_3$ to total iron oxide of the glass in terms of $Fe_2O_3$, which is represented by the above-mentioned formula (1), is defined as the redox of iron, the redox of iron is within a range of 0 to 30%, as described above. It is preferably 25% or less, more preferably 20% or less, still more preferably 15% or less, and most preferably 12% or less. In order to increase the transmittance in the visible light region as described above, lower redox is preferred. However, considering to alleviate the effect of the absorption due to $Fe^{3+}$ present even in small amount and to improve melting properties, it is sometimes desirable to contain some amount of $Fe^{2+}$. The redox of iron in that case is preferably 0.1% or more, and more preferably 0.5% or more.

In the glass of the present invention, light absorption of the inside of the glass in a wavelength region of 380 nm to 780 nm is suppressed by allowing the contents of $Fe^{2+}$ and $Fe^{3+}$ of the glass to satisfy the above-mentioned range. Thus, the glass of the present invention can be effectively used for applications requiring a high visible light transmittance, such as light source applications of electronic devices, including light guide bodies of liquid crystal televisions such as edge light type devices, and architectural interior and exterior applications, solar cell substrate glass, cover glass, exterior applications of various electronic devices required to have a high visible light transmittance.

In the glass of the present invention, the content of total cerium oxide (t-$CeO_2$) in terms of $CeO_2$ is 1000 ppm or less, for functioning as the oxidizing agent, decreasing the discoloration, satisfying spectral properties and suppressing the influence of the solarization. It is preferably 600 ppm or less, more preferably 500 ppm or less, still more preferably 400 ppm or less, particularly preferably 350 ppm or less, and most preferably 250 ppm or less. Though cerium oxide may not be contained, in order to expect a function as the oxidizing agent and to stabilize the spectral properties and the melting properties of the product, the lower limit of the content of total cerium oxide is preferably 1 ppm or more. The lower limit of the content of total cerium oxide is more preferably 10 ppm or more, and particularly preferably 30 ppm or more. When the content of total cerium oxide is equivalent to or more than the content of total iron oxide, the solarization due to cerium oxide prevailingly proceeds. Accordingly, the solarization due to manganese oxide is suppressed.

On the other hand, based on the experiments of the present inventors, it has become clear whether or not cerium oxide sufficiently functions as the oxidizing agent depends on the content of total iron oxide. In the present invention, in the case of expecting the effect of cerium oxide as the oxidizing agent, the content of total cerium oxide is determined so as to satisfy the range of the following formula (2) defining the ratio of the content of total cerium oxide and that of total iron oxide.

$$1 \leq [\text{t-CeO}_2]/[\text{t-Fe}_2\text{O}_3] \leq 45 \qquad \text{formula (2)}$$

That is, the ratio of [t-$CeO_2$]/[t-$Fe_2O_3$] is required to be 1 or more (that is, the content of $CeO_2$ is required to be equivalent to or more than the content of $Fe_2O_3$), in order to increase the effect of $CeO_2$ as the oxidizing agent and to suppress the solarization due to manganese oxide, and it is preferably 1.5 or more, more preferably 3 or more, and still more preferably 5 or more. In addition, the ratio of [t-$CeO_2$]/[t-$Fe_2O_3$] is required to be 45 or less (that is, the content of $CeO_2$ is required to be 45 times or less the content of $Fe_2O_3$) in order to be capable of suppressing the solarization or the discoloration due to $CeO_2$. It is preferably 35 or less, more preferably 30 or less, still more preferably 22 or less, particularly preferably 15 or less, and most preferably 10 or less.

Furthermore, it is known that the states of cerium oxide contained in glass generally take the forms of $Ce^{3+}$ and $Ce^{4+}$. It has become clear by the experiments of the present inventors that when the ratio of them, namely $Ce^{3+}/Ce^{4+}$, can be lowered, that is, when the state of $Ce^{4+}$ in the cerium oxide can be increased, cerium oxide becomes easy to function as the oxidizing agent, so that it is effective for decreasing the redox of iron. The reason for this is considered as follows.

It is considered that the ratio of $Fe^{2+}$ and $Fe^{3+}$ in a glass can be represented by the following equilibrium reaction formula according to the state of presence of cerium oxide.

$$Fe^{2+} + Ce^{4+} \leftrightarrow Fe^{3+} + Ce^{3+}$$

In the above formula, K is the equilibrium constant.

Accordingly, lower $Ce^{3+}/Ce^{4+}$ makes it possible to decrease the $Fe^{2+}$ amount in glass. $Ce^{3+}/Ce^{4+}$ can be estimated as $$Ce^{3+}/Ce^{4+} = (A_{CE3+(1)} + A_{CE3+(2)})/(A_{CE4+(1)} + A_{CE4+(2)})$$

from intensities $A_{CE3+(1)}$, $A_{CE3+(2)}$, $A_{CE4+(1)}$ and $A_{CE4+(2)}$ of 4 light absorption peaks $Ce^{3+}$ (1), $Ce^{3+}$ (2), $Ce^{4+}$ (1) and $Ce^{4+}$ (2) belonging to $Ce^{3+}$ and $Ce^{4+}$, respectively, which are present within a range of wavelengths from 200 to 380 nm, as described later. Here, $Ce^{3+}/Ce^{4+}$ is preferably 2.0 or less, more preferably 1.5 or less, still more preferably 1.2 or less, and particularly preferably 1.0 or less.

It has become clear by the experiments of the present inventors that it is effective to control basicity of the alkaline earth metal oxides according to the iron amount in glass, in order to allow cerium oxide in glass to effectively work as the oxidizing agent. The present inventors have found that capture of oxygen by a Ce ion and transfer of oxygen from the Ce ion to a Fe ion effectively proceed by keeping $O^{2-}$ activity (that is, the degree of basicity) in glass at a high state. When cerium oxide is contained in the glass of the present invention and the total iron oxide content is 145 ppm or less, the contents of the alkaline earth metal oxides contained in the glass are set within a range satisfying the following formula (3):

$$64\times[\text{MgO}] + 100\times[\text{CaO}] + 127\times[\text{SrO}] + 156\times[\text{BaO}] \geq 1200 \qquad \text{formula (3)}$$

In particular, when cerium oxide is contained in the glass article of the present invention and the total iron oxide content is 80 ppm or less, the total iron oxide amount is extremely decreased, thereby relatively decreasing the $O^{2-}$ activity in a matrix composition, by which the Ce ion is affected. Accordingly, in order to allow cerium oxide in glass to effectively work as the oxidizing agent, the contents of the alkaline earth metal oxides are preferably set within a range satisfying the following formula (4):

$$64\times[\text{MgO}] + 100\times[\text{CaO}] + 127\times[\text{SrO}] + 156\times[\text{BaO}] \geq 1000 \qquad \text{formula (4)}$$

Herein, in formulae (3) and (4), [MgO] is the content (mass %) of MgO, [CaO] is the content (mass %) of CaO, [SrO] is the content (mass %) of SrO, and [BaO] is the content (mass %) of BaO. Each coefficient represents the degree given to the degree of basicity by each component.

As described above, in the glass article of the present invention, the basicity of the alkaline earth metal oxides in the glass is controlled according to the iron amount contained in the glass, so that a small amount of cerium oxide effectively works as a oxidizing agent to enhance productivity of low redox glass. This is the effect which has not been obtained by the conventional glass.

In addition, the solarization is a discoloration phenomenon which occurs by changing of $Fe^{3+}$ to $Fe^{2+}$ (or $[Fe^{3+}]^-$) caused by trapping an electron discharged when $Ce^{3+}$ in glass is changed to $Ce^{4+}$ (or $[Ce^{3+}]^+$) by ultraviolet rays. Accordingly, in order to suppress the solarization, in addition to decreasing $Fe^{3+}$ on the receiving side, that is, decreasing the total iron amount, the smaller light absorption peaks of $Ce^{3+}$ are preferred. It has been known that $Ce^{3+}$ in glass generates two light absorption peaks near a wavelength of 302 nm and a wavelength of 318 nm. The present inventors have experimentally found that the influence of the solarization on the glass can be reduced by controlling the total $I_{na(II)} = A_{Ce3+(1)} + A_{Ce3+(2)}$ of the intensities of these two light absorption peaks (Abs./cm$^{-1}$) to 5.0 cm$^{-1}$ or less. It is preferably 4.5 cm$^{-1}$ or less, more preferably 3.5 cm$^{-1}$ or less, and particularly preferably 3 cm$^{-1}$ or less.

In the glass of the glass article of the present invention, cerium oxide effectively works as the oxidizing agent in a small amount by controlling the basicity of the alkaline earth metal oxides in the glass depending on the iron amount contained in the glass. In addition to that, light absorption due to Ce$^{3+}$ is suppressed low. Accordingly, an effect that the solarization hardly occurs, which has not been achieved by the conventional glass, is obtained.

Also in the case where the content of total cerium oxide is equivalent to or more than the content of total iron oxide, too much content of manganese oxide is not preferred since it becomes impossible to suppress the solarization due to the manganese oxide. The content of total manganese oxide (t-MnO$_2$) in terms of MnO$_2$ is preferably from 0.01 to 100 ppm, more preferably from 0.01 to 20 ppm, and still more preferably from 0.01 to 10 ppm.

On the other hand, when the content of total cerium oxide is small compared to the content of total iron oxide or substantially none of cerium oxide is contained, that is, when the following formula (5) is satisfied, the solarization due to manganese oxide contained as an impurity is considerable in the conventional glass.

$$[t\text{-}CeO_2]/[t\text{-}Fe_2O_3]<1 \quad \text{formula (5)}$$

The present inventors have found that the solarization can be suppressed by controlling the content of total manganese oxide, the ratio of the content of total manganese oxide and that of total iron oxide, and the basicity of the alkaline earth metal oxides.

In the glass of the present invention, in order to suppress the discoloration and the solarization small, the content of total manganese oxide (t-MnO$_2$) in terms of MnO$_2$ is 5 ppm or less. It is preferably 3 ppm or less, more preferably 2 ppm or less, and particularly preferably 1 ppm or less. In order to suppress an increase in purification cost of the raw material, the content of total manganese oxide (t-MnO$_2$) in terms of MnO$_2$ is 0.01 ppm or more, preferably 0.1 ppm or more, and more preferably 0.2 ppm or more.

In the glass of the present invention, the content of total cerium oxide is determined so that the range of the following formula (6) of the ratio of the content of total manganese oxide and that of total iron oxide is satisfied.

$$0.001 \leq [t\text{-}MnO_2]/[t\text{-}Fe_2O_3] \leq 0.5 \quad \text{formula (6)}$$

That is, in order to suppress the solarization, the ratio of [t-MnO$_2$]/[t-Fe$_2$O$_3$] is 0.5 or less, preferably 0.4 or less, more preferably 0.2 or less, particularly preferably 0.15 or less, and most preferably 0.1 or less. In order to suppress an increase in purification cost of the raw material, the ratio of [t-MnO$_2$]/[t-Fe$_2$O$_3$] is 0.001 or more, preferably 0.01 or more, more preferably 0.02 or more, and particularly preferably 0.05 or more.

When the content of total cerium oxide is small compared to the content of total iron oxide or substantially none of cerium oxide is contained, the redox of iron can be decreased by increasing the oxygen concentration in an atmosphere in the furnace higher than conventional one. In this case, it has become clear by the experiments of the present inventors that it is effective to control the basicity of the glass with the alkaline earth metal oxides. In order to allow oxygen in the atmosphere in the furnace to effectively work on the decrease in the redox of iron, it is necessary to increase the O$^{2-}$ activity (that is, the degree of basicity) in the glass matrix composition to a state where it is high to some extent. However, when cerium oxide is not contained, oxygen directly works on the iron ion, so that when the degree of basicity is too high, there is a concern that the oxygen coordination number of Fe$^{2+}$ is increased to increase the discoloration in the visible region. It is therefore unfavorable that the degree of basicity is too high.

When cerium oxide is not contained in the glass of the present invention and the total iron oxide content is 145 ppm or less, the contents of the alkaline earth metal oxides contained in the glass are set within a range satisfying the following formula (7):

$$80 \leq (64 \times [MgO] + 100 \times [CaO] + 127 \times [SrO] + 156 \times [BaO]) \leq 3000 \quad \text{formula (7)}$$

When cerium oxide is not contained in the glass of the present invention and the total iron oxide content is 80 ppm or less, the concern is further increased that the oxygen coordination number of Fe$^{2+}$ is increased to increase the discoloration in the visible region. Accordingly, the contents of the alkaline earth metal oxides contained in the glass are set within a range satisfying the following formula (8):

$$80 \leq (64 \times [MgO] + 100 \times [CaO] + 127 \times [SrO] + 156 \times [BaO]) \leq 2500 \quad \text{formula (8)}$$

Herein, in formulae (7) and (8), [MgO] is the content (mass %) of MgO, [CaO] is the content (mass %) of CaO, [SrO] is the content (mass %) of SrO, and [BaO] is the content (mass %) of BaO. Each coefficient represents the degree given to the degree of basicity by each component.

The matrix composition of the glass of the glass article of the present invention includes multicomponent oxide glass, and can be widely selected from ones which can easily obtain the high average internal transmittance in the visible light region described above.

In particular, it is preferred for satisfying the high average internal transmittance in the visible light region described above that the multicomponent oxide glass used for the glass article of the present invention is low in the content of the component having absorption in the visible light region or does not contain such a component.

Typical examples of the preferred matrix compositions of the glass of the glass article include one having the following composition in terms of mass % on the basis of the following oxides. This matrix composition is a composition excluding total iron oxide (t-Fe$_2$O$_3$) in terms of Fe$_2$O$_3$, total cerium oxide (t-CeO$_2$) in terms of CeO$_2$, total manganese oxide (t-MnO$_2$) in terms of MnO$_2$, and other components having a content of less than 1%. The glass of the glass article of the present invention should not be construed as being limited to the glass example shown herein.

SiO$_2$: from 50 to 80%,
Al$_2$O$_3$: from 0.1 to 20%,
B$_2$O$_3$: from 0 to 10%,
Li$_2$O: from 0 to 5%,
Na$_2$O: from 3 to 15%,
K$_2$O: from 0 to 10%,
MgO: from 0 to 15%,
CaO: from 0 to 15%,
SrO: from 0 to 15%,
BaO: from 0 to 15%,
Li$_2$O+Na$_2$O+K$_2$O: from 5 to 15%, and
MgO+CaO+SrO+BaO: from 1 to 35%.

The above-mentioned composition ranges of the respective components of the matrix composition of the glass of the glass article of the present invention are described.

SiO$_2$ is a main component of the glass.

In order to keep weather resistance and devitrification properties of the glass, the content of SiO$_2$ is 50% or more, in terms of mass % on the basis of oxides. It is preferably 60% or more, more preferably 65% or more, and still more preferably 67% or more. On the other hand, in order to make melting easy to improve foam quality, furthermore, in order to suppress low the content of ferrous iron ($Fe^{2+}$) in the glass to improve optical properties, the content of $SiO_2$ is 80% or less. It is preferably 75% or less, more preferably 74% or less, and still more preferably 72% or less.

$Al_2O_3$ is an essential component for improving the weather resistance of the glass. In order to maintain the weather resistance practically necessary in a composition system of the glass of the present invention, it is necessary to contain $Al_2O_3$ in an amount of 0.1% or more. It is preferably 1.5% or more, and more preferably 2.5% or more. However, in order to suppress low the content of ferrous iron ($Fe^{2+}$) to improve the optical properties, and in order to improve the foam properties, the content of $Al_2O_3$ is preferably 20% or less. It is more preferably 10% or less, still more preferably 8% or less, and particularly preferably 5% or less.

$B_2O_3$ is a component for promoting melting of the glass raw material and improving mechanical properties and the weather resistance. However, in order to prevent the occurrence of disadvantages such as formation of striae (ream) and erosion of a furnace wall due to volatilization by addition thereof to soda lime silicate-based glass such as the glass of the present invention, the content thereof is preferably 10% or less. It is more preferably 5% or less, and still more preferably 2% or less, and it is particularly preferred that substantially none of $B_2O_3$ is contained.

The term "substantially none of a substance is contained" in the present description hereinafter means that a substance is not contained except for unavoidable impurities.

The alkaline metal oxides such as $Li_2O$, $Na_2O$ and $K_2O$ are components useful for promoting melting of the glass raw material and adjusting thermal expansion, viscosity and the like. Accordingly, the total content ($Li_2O+Na_2O+K_2O$) of these alkaline metal oxides is preferably 5% or more. It is more preferably 7% or more, still more preferably 9% or more, and particularly preferably 10% or more. However, in order to keep chemical durability of the glass, $Li_2O+Na_2O+K_2O$ is preferably 15% or less. It is more preferably 13.5% or less, still more preferably 13% or less, and particularly preferably 12.5% or less.

$Li_2O$ is a component useful for promoting melting of the glass raw material and adjusting the thermal expansion, the viscosity and the like. However, in order to make vitrification easy, to suppress low the content of iron contained as an impurity derived from the raw material and to suppress batch cost low, the content thereof is preferably 5% or less, more preferably 2.5% or less, still more preferably 2% or less, and most preferably 1% or less.

$Na_2O$ is a component useful for promoting melting of the glass raw material and adjusting the thermal expansion, the viscosity and the like. The content thereof is preferably 3% or more, more preferably 5% or more, still more preferably 7% or more, and particularly preferably 10% or more. However, in order to keep chemical durability of the glass, it is preferably 15% or less, more preferably 13.5% or less, still more preferably 13% or less, and particularly preferably 12.5% or less.

$K_2O$ is a component useful for promoting melting of the glass raw material and adjusting the thermal expansion, the viscosity and the like. However, in order to maintain the weather resistance and the devitrification properties, the content thereof is preferably 10% or less, more preferably 7.5% or less, and still more preferably 5% or less. In addition, in order to suppress the batch cost, it is preferably 3% or less, and particularly preferably 2% or less.

The alkaline earth metal oxides such as MgO, CaO, SrO and BaO are components useful for promoting melting of the glass raw material and adjusting the thermal expansion, the viscosity and the like. Accordingly, the total content (MgO+CaO+SrO+BaO) of these alkaline earth metal oxides is 1% or more. It is preferably 7.2% or more, more preferably 13% or more, still more preferably 14% or more, and particularly preferably 15% or more. However, in order to suppress low the thermal expansion coefficient, to improve the devitrification properties, and to maintain the strength, MgO+CaO+SrO+BaO is 35% or less. It is preferably 30% or less, more preferably 25% or less, still more preferably 23% or less, and particularly preferably 22% or less.

MgO has a function of decreasing the viscosity at the time of glass melting and promoting melting. Also, it has a function of decreasing the specific gravity and preventing the glass article from being damaged. Accordingly, it can be added for increasing the size of a plate-like light guide body of an edge light type liquid crystal television. In order to decrease the thermal expansion coefficient of the glass and to improve the devitrification, the content thereof is preferably 15% or less, more preferably 12% or less, still more preferably 7.5% or less, and yet still more preferably 5% or less. Further preferably, it is 3% or less, and most preferably 2% or less.

CaO may be contained since it is a component useful for promoting melting of the glass raw material and adjusting the viscosity, the thermal expansion and the like. In order to obtain the above-mentioned functions, the content thereof is preferably 3% or more, more preferably 5% or more, still more preferably 6% or more, and particularly preferably 7% or more. In order to improve the devitrification properties, it is preferably 15% or less, more preferably 14% or less, and still more preferably 13% or less.

SrO has effects of increasing the thermal expansion coefficient and decreasing high-temperature viscosity of the glass. In order to obtain the above-mentioned effects, it is preferably contained in an amount of 2% or more. However, in order to suppress low the thermal expansion coefficient of the glass, the content thereof is preferably 15% or less, more preferably 8% or less, and still more preferably 6% or less.

BaO has effects of increasing the thermal expansion coefficient and decreasing high-temperature viscosity, as with the case of SrO. In order to obtain the above-mentioned effects, it is preferably contained in an amount of 2% or more. However, in order to suppress low the thermal expansion coefficient of the glass, the content thereof is preferably 15% or less, more preferably 8% or less, and still more preferably 6% or less.

In the glass of the glass article of the present invention, the ratio of $Ce^{3+}/Ce^{4+}$ can be made lower than that of general soda lime glass, that is, the redox of cerium can be decreased by adjusting composition and content of oxidizing oxides in the alkaline earth metal oxides in the matrix composition of the glass. Specifically, it is preferred to suppress low the contents of oxidizing oxides such as CaO and MgO. This makes it possible to allow cerium oxide to efficiently work as the oxidizing agent, and further to prevent the occurrence of the solarization.

Specific means for decreasing the content of CaO include a method of decreasing the ratio of CaO in the alkaline earth metal oxides by replacing CaO with another alkaline earth metal oxide. For example, $[Ce^{3+}]/[Ce^{4+}]$ can be decreased from about 0.4 to about 0.2 by decreasing [CaO]/[RO] by 2.5% from 0.5 to 0.475.

In the matrix composition of the glass of the glass article of the present invention, at least one of $ZrO_2$, $SnO_2$, $SO_3$, $Sb_2O_3$ and $As_2O_3$ may be contained as an optional component.

For example, the glass of the glass article of the present invention may contain $ZrO_2$ for improvement of heat resistance and surface hardness of the glass. However, in terms of maintenance of the devitrification properties and maintenance of low density, it is preferred that substantially none of $ZrO_2$ is contained.

In addition, the glass of the glass article of the present invention may contain $SnO_2$ as a clarifying agent. In this case, the content of total tin in terms of $SnO_2$ is preferably from 0 to 1%, in terms of mass %. It is more preferably 0.5% or less, still more preferably 0.2% or less, and particularly preferably 0.1% or less. It is further preferred that substantially none of $SnO_2$ is contained.

Furthermore, the glass of the glass article of the present invention may contain $SO_3$ as the clarifying agent. In this case, the $SO_3$ content is preferably more than 0% and 0.5% or less, in terms of mass %. It is more preferably 0.3% or less, still more preferably 0.2% or less, and yet still more preferably 0.1% or less.

In addition, the glass of the glass article of the present invention may contain Cl as the clarifying agent. In this case, the Cl content is preferably more than 0% and 0.3% or less, in terms of mass %. It is more preferably 0.2% or less, still more preferably 0.1% or less, and yet still more preferably 0.01% or less.

Further, the glass of the glass article of the present invention may contain $Sb_2O_3$ or $As_2O_3$ as the oxidizing agent and/or the clarifying agent. In this case, the content of $Sb_2O_3$ or $As_2O_3$ is preferably from 0 to 0.5%, in terms of mass %. It is more preferably 0.2% or less, and still more preferably 0.1% or less. It is further preferred that substantially none of $Sb_2O_3$ or $As_2O_3$ is contained.

However, since $Sb_2O_3$, $SnO_2$ and $As_2O_3$ described above also work as the oxidizing agent of the glass, it may be added within the above-mentioned range for the purpose of adjusting the amount of $Fe^{2+}$ of the glass. However, $As_2O_3$ should not be actively contained due to environmental aspect.

In addition, the glass of the glass article of the present invention may contain trace components such as Ni, Cr, Ti, Cu, Co, Se and the like as the trace components. However, since these components can be a factor which causes a decrease in the transmittance of the glass, the total content thereof is preferably less than 100 ppm, and more preferably less than 10 ppm.

From the viewpoints of rigidity, heat resistance and water resistance, it is preferred that the glass article of the present invention has the following properties, particularly when used as a glass plate, as a light guide body of an edge light type light guide body unit of a large-sized liquid crystal television.

In order to cope with increasing size of a screen of the liquid crystal television, it is preferred that the glass plate as the light guide body has an effective optical path length of 25 to 200 cm. The effective optical path length as used herein corresponds to the distance from an end face on which light is incident to an end face on the opposite side, when used as the light guide body, that is, the length in the horizontal direction of the light guide body.

When the effective optical path length is 25 cm or more, it can be used in the light guide body unit of the liquid crystal television having a size of 20 inches or more.

For the glass plate as the light guide body, the effective optical path length thereof is more preferably from 30 to 150 cm, and still more preferably from 35 to 120 cm.

On the other hand, when the effective optical path length increases, for example, when the effective optical path length becomes longer than 200 cm, the average internal transmittance decreases accordingly, and it becomes difficult to achieve the required internal transmittance.

That is, when the optical path length of the light guide body becomes longer, the internal transmittance of light in the visible light region (380 to 780 nm), particularly between wavelengths of 400 and 700 nm, becomes insufficient, which causes problems such as a decrease in luminance of the light guide body, the occurrence of luminance unevenness and the occurrence of color unevenness.

When the glass article of the present invention is used as the glass plate for the light guide body, occurrence of such problems should be prevented. More specifically, the minimum value of the transmittance within the range of wavelengths from 400 to 700 nm under conditions of an effective optical path length of 5 cm is preferably 85% or more, and the difference between the maximum value and the minimum value of the above-mentioned transmittance is preferably 3.8% or less. By satisfying these conditions, the minimum value of the internal transmittance of the glass plate in the whole wavelength region of wavelengths from 400 to 700 nm under conditions of an optical path length of 200 cm is 80% or more, and the difference between the maximum value and the minimum value of the internal transmittance becomes 15% or less. The minimum value of the transmittance within the range of wavelengths from 400 to 700 nm under the conditions of an effective optical path length of 5 cm is more preferably 88% or more.

When the glass article of the present invention is used as the glass plate for the light guide body, particularly when the glass plate is used as the light guide body of the light guide body unit of the edge light type liquid crystal television, it is preferred that this glass plate is a substantially rectangular plate and has a thickness of 0.5 mm or more. In the case of the light guide body, the thickness of the glass plate corresponds to the length in the perpendicular direction. When used as the glass plate of the light guide body for the above-mentioned application, the length of at least one side, which is the optical path length, is preferably 200 cm or less.

The internal transmittance of the glass plate is also influenced by the thickness of the glass plate. When the thickness of the glass plate is thinner than 0.5 mm, the number of times of reflection on a glass surface is increased at the time of use as the light guide body, and attenuation due to the reflection is increased to decrease the internal transmittance at the effective optical path length. Accordingly, it becomes difficult to achieve the required internal transmittance. It is preferably 1 mm or more, and more preferably 1.5 mm or more.

On the other hand, although there is no particular upper limit to the thickness of the glass plate, practically preferred is 10 mm or less. When the thickness thereof is more than 10 mm, the number of times of scattering propagated light to a light scattering part under the light guide body is decreased at the time of use as the light guide body, so that the amount of light taken out to the outside is decreased. Accordingly, the internal transmittance at the effective optical path length is decreased. For this reason, it becomes difficult to achieve the required internal transmittance. It is preferably 5 mm or less, and more preferably 2.5 mm or less.

In addition, when the glass article of the present invention is used as the glass plate for the light guide body, in the case where the glass plate is irradiated with a high-pressure mercury lamp having an illuminance of 45 mW/cm² for 30 seconds, the difference Δ % T@400 nm in the transmittance at a wavelength of 400 nm and an optical path length of 1 mm before and after irradiation is preferably 1.5% or less. It is more preferably 1.25% or less, and still more preferably 1.0% or less. When the glass plate is irradiated with the high-pressure mercury lamp, the glass plate shall be placed on a black cloth and irradiated in a darkroom.

Furthermore, when the glass article of the present invention is used as the substantially rectangular planer glass plate for the light guide body, at least one of the end faces of the glass plate, more preferably at least the end face on the side on which the light from a planer light emitting device enters, is preferably polished. By such polishing, the efficiency of incidence of light from the light source can be increased, and the strength of the glass plate can also be improved. In this description, one having an arithmetic average roughness Ra of 0.1 μm or less shall be considered to be one polished.

When the glass article of the present invention is the glass plate, for a production method of this glass plate, glass raw materials are mixed so as to form glass containing, in terms of mass % or mass ppm on the basis of oxides, 50 to 80% of $SiO_2$, 0 to 10% of $K_2O$, 1 to 145 ppm of total iron oxide (t-$Fe_2O_3$) in terms of $Fe_2O_3$, 1 to 1000 ppm of total cerium oxide (t-$CeO_2$) in terms of $CeO_2$, and 1 to 35% of at least one selected from the group consisting of alkaline earth metal oxides of MgO, CaO, SrO and BaO in the total amount thereof to obtain a glass batch. Alternatively, glass raw materials are mixed so as to form glass containing, in terms of mass % or mass ppm on the basis of oxides, 50 to 80% of $SiO_2$, 0 to 10% of $K_2O$, 1 to 145 ppm of total iron oxide (t-$Fe_2O_3$) in terms of $Fe_2O_3$, 0.01 to 5 ppm of total manganese oxide (t-$MnO_2$) in terms of $MnO_2$, and 1 to 35% of at least one selected from the group consisting of alkaline earth metal oxides of MgO, CaO, SrO and BaO in the total amount thereof to obtain a glass batch. Then, there can be adopted a method of melting the resulting glass batch to obtain a molten glass, and thereafter forming the above-mentioned molten glass by using at least any one usual forming process selected from the group consisting of a float process, a roll-out process, a pull-up process and a fusion process to obtain the glass plate.

A preferred composition range of the glass used in the above-mentioned production method of the glass plate is as follows:
in terms of mass % or mass ppm on the basis of the following oxides,
$SiO_2$: from 50 to 80%,
$Al_2O_3$: from 0.1 to 20%,
$B_2O_3$: from 0 to 10%,
$Li_2O$: from 0 to 5%,
$Na_2O$: from 3 to 15%,
$K_2O$: from 0 to 10%,
MgO: from 0 to 15%,
CaO: from 0 to 15%,
SrO: from 0 to 15%,
BaO: from 0 to 15%,
$Li_2O+Na_2O+K_2O$: from 5 to 15%,
MgO+CaO+SrO+BaO: from 1 to 35%,
total iron oxide in terms of $Fe_2O_3$: from 1 to 145 ppm, and
total cerium oxide in terms of $CeO_2$: from 1 to 1000 ppm.

In addition, another preferred composition range of the glass used in the above-mentioned production method of the glass plate is as follows:
$SiO_2$: from 50 to 80%,
$Al_2O_3$: from 0.1 to 20%,
$B_2O_3$: from 0 to 10%,
$Li_2O$: from 0 to 5%,
$Na_2O$: from 3 to 15%,
$K_2O$: from 0 to 10%,
MgO: from 0 to 15%,
CaO: from 0 to 15%,
SrO: from 0 to 15%,
BaO: from 0 to 15%,
$Li_2O+Na_2O+K_2O$: from 5 to 15%,
MgO+CaO+SrO+BaO: from 1 to 35%,
total iron oxide in terms of $Fe_2O_3$: from 1 to 145 ppm, and
total manganese oxide in terms of $MnO_2$: from 0.01 to 5 ppm.

EXAMPLES

Examples of the present invention will be described below.

Raw materials for respective components were mixed to afford the target composition, and melted using a platinum crucible at 1350° C. for 1 hour. In melting, 400 g of the raw materials were charged in 3 separate times at 20-minute intervals. Subsequently, a melt obtained was elevated in temperature to a predetermined temperature of 1450 to 1650° C., taking 1 hour, and thereafter, allowed to stand still for 3 hours. The melting temperature in the second stage was appropriately selected according to clarity of the glass. In Examples 58 to 66, the glass was melted while allowing oxygen gas to flow in the atmosphere at 1 L/min.

The glass melt was poured out onto a preheated carbon mold, and after molding to a plate form, it was slowly cooled.

The raw material kinds were selected from silica sand, aluminum oxide, sodium carbonate and other glass raw materials generally used. In addition, as the grain size of the raw material, one within a range of 1 to 1000 μm was used, and salt cake was added in an amount of 0.3 mass % as the clarifying agent.

A glass block obtained was cut, and a part thereof was polished. Then, the content (mass ppm) of total iron oxide in terms of $Fe_2O_3$ was determined with a fluorescent X-ray analyzer. The content of $Fe^{2+}$ was measured in accordance with ASTM C169-92. The content of $Fe^{2+}$ measured was represented in terms of $Fe_2O_3$.

When the content of $Fe^{2+}$ in the glass was less than 4.0 mass ppm, the $Fe^2$ amount was determined by the following method. First, for glass prepared so that the $Fe^{2+}$ content exceeded 4.0 mass ppm by appropriately adjusting the total iron amount with the same glass matrix composition, the $Fe^{2+}$ content $C_{Fe2+}$ (mass ppm) was measured by a method in accordance with ASTM C169-92. The spectral transmittance within a range of wavelengths from 1,000 to 1,250 nm of this glass was measured in accordance with spectrometry described later. The minimum value % $T_{MIN}$ of the transmittance within this range is proportional to the $Fe^{2+}$ content in the glass, so that using a calibration curve $Y=(C_{Fe2+}/\%\ T_{MIN})\times X$, the $Fe^{2+}$ content in the glass was calculated from spectrometry results. X as used herein is the minimum value of the spectral transmittance within a range of wavelengths from 1,000 to 1,250 nm of the glass in which the $Fe^{2+}$ content is less than 4.0 mass ppm, and Y is the content of $Fe^{2+}$ contained in the glass.

In addition, the content of total cerium oxide in terms of $CeO_2$ and the content of total manganese oxide in terms of $MnO_2$ were determined by ICP emission spectrometry.

For a part of the glass block obtained, an optically homogeneous region in which striae and the like were not present was visually selected, and polished so that 6 faces became mirror surfaces, with a size of 50 mm×30 mm×5 mm, to prepare a glass plate for measurement. For this glass plate, the spectral transmittance at a length of 50 mm was measured using a spectrophotometer UH-4150 manufactured by Hitachi High-Technologies Corporation, which was combined with a sample holder manufactured by Hitachi High-Technologies Corporation and capable of measuring a long sample.

For the glass plate obtained, an ultraviolet irradiation test was also performed in combination, in order to evaluate an influence of a decrease in the transmittance caused by ultraviolet irradiation. This ultraviolet irradiation test was performed as follows. The glass plate sample having a thickness of 1 mm was irradiated for 30 seconds after a high-pressure mercury lamp was adjusted to an illuminance of 45 mW/cm$^2$ on a surface of the glass plate, and the difference Δ % T@400 nm in the transmittance at a wavelength of 400 nm before and after irradiation was measured.

The value of $I_{na(II)}$ in the glass plate obtained was calculated by the following method. In addition, for the glass plate obtained, the total iron amount and redox of iron were measured. Furthermore, a light absorption spectrum within a range of wavelengths from 200 nm to 380 nm of the glass plate having a thickness of 1 mm was measured using a spectrophotometer U-4100 manufactured by Hitachi High-Technologies Corporation. Subsequently, a 1-mm-thick glass plate for reference having values equivalent to the total iron amount and the redox of iron of the glass plate obtained and free of cerium oxide was prepared, and for this, a light absorption spectrum for reference within a range of wavelengths from 200 to 380 nm was measured. From the difference between the light absorption spectrum for reference and the light absorption spectrum of the glass plate obtained, a light absorption spectrum $ABS_{CeO2(\lambda)}$ caused by $CeO_2$ was obtained.

When $ABS_{CeO2(\lambda)}$ is considered as a function $ABS_{CeO2(\kappa)}$ to the wave number ($\kappa=1/\lambda$), it can be expressed as the overlap of four Gaussian functions. These four peaks were defined as $Ce^{3+}$ (1), $Ce^{3+}$ (2), $Ce^{4+}$ (1) and $Ce^{4+}$ (2) from the smaller wave number (lower energy) side, that is, from the longer wavelength side.

Each peak is described by a Gaussian function $A \times \exp(-(\kappa-B)^2/(2 \times C^2))$. Accordingly, the value of each coefficient was determined by a least-squares method so that the sum of squares of residuals between $ABS_{CeO2(\kappa)}$ and $ABS_{CALC(\kappa)}$ calculated by the following formula became minimum. The calculation by the least-square method can be performed by using commercially available spreadsheet software or statistical analysis software.

$$ABS_{CALC(\kappa)} = A_{CE3+(1)} \times \exp(-(\kappa-B_{CE3+(1)})^2/(2 \times C_{CE3+(1)}^2)) + A_{CE3+(2)} \times \exp(-(\kappa-B_{CE3+(2)})^2/(2 \times C_{CE3+(2)}^2)) + A_{CE4+(1)} \times \exp(-(\kappa-B_{CE4+(1)})^2/(2 \times C_{CE4+(1)}^2)) + A_{CE4+(2)} \times \exp(-(\kappa-B_{CE4+(2)})^2/(2 \times C_{CE4+(2)}^2))$$

in which for the values of B, peak positions of $Ce^{3+}$ and $Ce^{4+}$ known in papers and the like were used as references of initial values. As an example, $B_{CE3+(1)}=31,422$ (cm$^{-1}$), $B_{CE3+(2)}=33,074$ (cm$^{-1}$), $B_{CE4+(1)}=39,761$ (cm$^{-1}$) and $B_{CE4+(2)}=47,566$ (cm$^{-1}$) can be exemplified.

Of the values thus calculated, using the values of $A_{CE3+(1)}$ and $A_{CE3+(2)}$ of the intensities of the two peaks $Ce^{3+}$ (1) and $Ce^{3+}$ (2) caused by $Ce^{3+}$, the value of $I_{na(II)}$ was determined as $I_{na(II)} = A_{CE3+(1)} + A_{CE3+(2)}$.

Embodiment 1

In Table 1 and Table 2, the glass composition (unit: mass %) of each of Examples 1 to 20, the content (unit: ppm) of total iron oxide (t-Fe$_2$O$_3$) in terms of Fe$_2$O$_3$ as the content of iron in the glass, the content (unit: ppm) of cerium oxide in terms of CeO$_2$, the redox of iron (Fe-redox) and the parameter $B_{RO}$ (represented as B_RO in the tables) calculated by the left side (64×[MgO]+100×[CaO]+127×[SrO]+156×[BaO]) of formula (3) are shown, and the change Δ % T@400 nm in the transmittance at a wavelength of 400 nm and an optical path length of 1 mm before and after irradiation of these glass samples with a high-pressure mercury lamp at an illuminance of 45 mW/cm$^2$ for 30 seconds, the transmittance (%) at an optical path length of 5 cm at wavelengths of 450 nm, 520 nm and 700 nm and $Ce^{3+}/Ce^{4+}$ are shown. Although not described in the tables, each glass contains 6.0 ppm of MnO$_2$, 0.5 ppm of NiO and 0.6 ppm of Cr$_2$O$_3$.

In the tables, Examples 1 to 16 are Working Examples, and Examples 17 to 20 are Comparative Examples.

Under conditions where the total iron oxide amount is 100 ppm and the cerium oxide amount is 600 ppm, in the compositions of Examples, the basicity of the alkaline earth metal oxides in the glass is controlled so as to satisfy $B_{RO} \geq 1200$, and $Ce^{3+}/Ce^{4+}$ is suppressed as low as 2.0 or less. It is therefore understood that the low redox of iron can be realized.

In Table 1 and Table 2, (t-Fe$_2$O$_3$) corresponds to Fe$_2$O$_3$ in the tables, and (t-CeO$_2$) corresponds to CeO$_2$ in the tables.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| SiO$_2$ (mass %) | 69.7 | 69.9 | 69.7 | 69.7 | 70.6 | 70.3 | 70 | 60 | 53.7 | 58 |
| Al$_2$O$_3$ (mass %) | 3 | 3 | 3 | 3 | 3 | 3 | 4 | 10 | 10 | 10 |
| Na$_2$O (mass %) | 11 | 9.8 | 11 | 11 | 9.2 | 10.1 | 11 | 11.4 | 9.3 | 5 |
| K$_2$O (mass %) | 0 | 1.9 | 0 | 0 | 0 | 0 | 0 | 0 | 0 | 0 |
| CaO (mass %) | 8 | 9 | 10 | 8 | 8.1 | 8.1 | 11 | 5 | 14 | 9.9 |
| MgO (mass %) | 0 | 0 | 0 | 0 | 0 | 0 | 0 | 0 | 0 | 0 |
| SrO (mass %) | 4 | 2.5 | 2.4 | 3.2 | 4.1 | 4 | 2 | 13.6 | 3 | 2.1 |
| BaO (mass %) | 4 | 3.6 | 3.6 | 4.8 | 4.1 | 4 | 0 | 0 | 10 | 15 |
| ZrO$_2$ (mass %) | 0 | 0 | 0 | 0 | 0 | 0 | 0 | 0 | 0 | 0 |
| B$_2$O$_3$ (mass %) | 0 | 0 | 0 | 0 | 0 | 0 | 2 | 0 | 0 | 0 |
| Li$_2$O (mass %) | 0 | 0 | 0 | 0 | 1 | 0.5 | 0 | 0 | 0 | 0 |
| Fe$_2$O$_3$ (mass ppm) | 100 | 100 | 100 | 100 | 100 | 100 | 100 | 100 | 100 | 100 |
| CeO$_2$ (mass ppm) | 600 | 600 | 600 | 600 | 600 | 600 | 600 | 600 | 600 | 600 |
| B_RO | 1932 | 1779.1 | 1866.4 | 1955.2 | 1970.3 | 1942 | 1354 | 2227.2 | 3341 | 3596.7 |
| Fe-redox (%) | 12 | 18 | 14 | 16 | 13 | 14 | 15 | 13 | 5 | 13 |
| Δ% T@400 nm | −1.4 |  |  |  |  |  |  |  |  |  |
| 450 nm % T@5 cm | 88 | 88 | 88 | 88 | 88 | 88 | 88 | 88 | 87 | 88 |
| 520 nm % T@5 cm | 90 | 90 | 90 | 90 | 90 | 90 | 90 | 90 | 90 | 90 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| 700 nm % T@5 cm | 86 | 84 | 85 | 85 | 86 | 85 | 85 | 86 | 88 | 86 |
| Ce3+/Ce4+ | 0.4 | 1.2 | 1.3 | 0.4 | 0.4 | 0.5 | 1.4 | 0.2 | 0.6 | 0.4 |

TABLE 2

|  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| $SiO_2$ (mass %) | 60 | 71 | 70.1 | 58.1 | 61 | 57 | 72 | 72.2 | 71.67 | 66.5 |
| $Al_2O_3$ (mass %) | 7 | 1 | 1 | 10 | 4.7 | 7 | 1 | 1.79 | 1.7 | 7.9 |
| $Na_2O$ (mass %) | 5 | 9 | 11.5 | 12.5 | 8.2 | 5 | 13.6 | 13.07 | 13 | 7.3 |
| $K_2O$ (mass %) | 1 | 0 | 0 | 0 | 0 | 6 | 0.06 | 0.44 | 0.7 | 5.3 |
| CaO (mass %) | 0 | 9.8 | 8.5 | 10.2 | 11 | 5 | 10.3 | 8.61 | 8.5 | 5 |
| MgO (mass %) | 0 | 5.9 | 3 | 9.2 | 6.8 | 2 | 2.43 | 3.88 | 4.2 | 8 |
| SrO (mass %) | 12 | 1.6 | 3.6 | 0 | 0 | 7 | 0 | 0 | 0 | 0 |
| BaO (mass %) | 15 | 1.7 | 2 | 0 | 8.3 | 8 | 0 | 0 | 0 | 0 |
| $ZrO_2$ (mass %) | 0 | 0 | 0 | 0 | 0 | 3 | 0 | 0 | 0 | 0 |
| $B_2O_3$ (mass %) | 0 | 0 | 0 | 0 | 0 | 0 | 0 | 0 | 0 | 2 |
| $Li_2O$ (mass %) | 0 | 0 | 0 | 0 | 0 | 0 | 0 | 0 | 0 | 0 |
| $Fe_2O_3$ (mass ppm) | 100 | 100 | 100 | 100 | 100 | 100 | 100 | 100 | 100 | 100 |
| $CeO_2$ (mass ppm) | 600 | 600 | 600 | 600 | 600 | 600 | 600 | 600 | 600 | 600 |
| B_RO | 3864 | 1826 | 1811.2 | 1608.8 | 2830 | 2765 | 1185.52 | 1109.32 | 1118.8 | 1012 |
| Fe-redox (%) | 12 | 6 | 17 | 22 | 16 | 20 | 31 | 33 | 34 | 37 |
| Δ% T@400 nm |  |  |  |  |  |  |  |  |  |  |
| 450 nm % T@5 cm | 88 | 87 | 88 | 88 | 88 | 88 | 89 | 89 | 89 | 89 |
| 520 nm % T@5 cm | 90 | 90 | 90 | 90 | 90 | 90 | 90 | 90 | 90 | 90 |
| 700 nm % T@5 cm | 86 | 88 | 84 | 83 | 85 | 83 | 79 | 79 | 79 | 78 |
| Ce3+/Ce4+ | 0.4 | 0.6 | 0.4 | 0.6 | 0.5 | 0.5 | 3.2 | 2.4 | 2.1 | 2.2 |

Embodiment 2

In Table 3 and Table 4, the glass composition (unit: mass %) of each of Examples 21 to 38, the content (unit: ppm) of total iron oxide (t-$Fe_2O_3$) in terms of $Fe_2O_3$ as the content of iron in the glass, the content (unit: ppm) of cerium oxide in terms of $CeO_2$, the redox of iron (Fe-redox) and the parameter $B_{RO}$ (represented as B_RO in the tables) calculated by the left side $(64 \times [MgO]+100 \times [CaO]+127 \times [SrO]+156 \times [BaO])$ of formula (3) are shown, and the change Δ % T@400 nm in the transmittance at a wavelength of 400 nm and an optical path length of 1 mm before and after irradiation of these glass samples with a high-pressure mercury lamp at an illuminance of 45 mW/cm² for 30 seconds, the transmittance (%) at an optical path length of 5 cm at wavelengths of 450 nm, 520 nm and 700 nm and $Ce^{3+}/Ce^{4+}$ are shown. Although not described in the tables, each glass contains 6.0 ppm of $MnO_2$, 0.5 ppm of NiO and 0.6 ppm of $Cr_2O_3$.

In the tables, Examples 21 to 37 are Working Examples, and Example 38 is Comparative Example.

Under conditions where the total iron oxide amount is 30 ppm and the cerium oxide amount is 250 ppm, in the compositions of Examples, the basicity of the alkaline earth metal oxides in the glass is controlled so as to satisfy $B_{RO} \geq 1000$, and $Ce^{3+}/Ce^{4+}$ is suppressed as low as 2.0 or less. It is therefore understood that the low redox of iron can be realized.

In Table 3 and Table 4, (t-$Fe_2O_3$) corresponds to $Fe_2O_3$ in the tables, and (t-$CeO_2$) corresponds to $CeO_2$ in the tables.

TABLE 3

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| $SiO_2$ (mass %) | 69.7 | 69.9 | 69.7 | 69.7 | 70.6 | 70.3 | 70 | 60 | 53.7 | 58 |
| $Al_2O_3$ (mass %) | 3 | 3 | 3 | 3 | 3 | 3 | 4 | 10 | 10 | 10 |
| $Na_2O$ (mass %) | 11 | 9.8 | 11 | 11 | 9.2 | 10.1 | 11 | 11.4 | 9.3 | 5 |
| $K_2O$ (mass %) | 0 | 1.9 | 0 | 0 | 0 | 0 | 0 | 0 | 0 | 0 |
| CaO (mass %) | 8 | 9 | 10 | 8 | 8.1 | 8.1 | 11 | 5 | 14 | 9.9 |
| MgO (mass %) | 0 | 0 | 0 | 0 | 0 | 0 | 0 | 0 | 0 | 0 |
| SrO (mass %) | 4 | 2.5 | 2.4 | 3.2 | 4.1 | 4 | 2 | 13.6 | 3 | 2.1 |
| BaO (mass %) | 4 | 3.6 | 3.6 | 4.8 | 4.1 | 4 | 0 | 0 | 10 | 15 |
| $ZrO_2$ (mass %) | 0 | 0 | 0 | 0 | 0 | 0 | 0 | 0 | 0 | 0 |
| $B_2O_3$ (mass %) | 0 | 0 | 0 | 0 | 0 | 0 | 2 | 0 | 0 | 0 |
| $Li_2O$ (mass %) | 0 | 0 | 0 | 0 | 1 | 0.5 | 0 | 0 | 0 | 0 |
| $Fe_2O_3$ (mass ppm) | 30 | 30 | 30 | 30 | 30 | 30 | 30 | 30 | 30 | 30 |
| $CeO_2$ (mass ppm) | 250 | 250 | 250 | 250 | 250 | 250 | 250 | 250 | 250 | 250 |
| B_RO | 1932 | 1779.1 | 1866.4 | 1955.2 | 1970.3 | 1942 | 1354 | 2227.2 | 3341 | 3596.7 |
| Fe-redox (%) | 12 | 14 | 14 | 15 | 11 | 14 | 16 | 13 | 5 | 10 |
| Δ% T@400 nm | −0.5 |  |  |  |  |  |  |  |  |  |
| 450 nm % T@5 cm | 90 | 90 | 90 | 90 | 90 | 90 | 90 | 90 | 90 | 90 |
| 520 nm % T@5 cm | 91 | 91 | 91 | 91 | 91 | 91 | 91 | 91 | 91 | 91 |

TABLE 3-continued

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| 700 nm % T@5 cm | 89 | 89 | 89 | 89 | 90 | 89 | 89 | 89 | 90 | 90 |
| Ce3+/Ce4+ | 0.4 | 1.2 | 1.3 | 0.6 | 0.4 | 0.5 | 1.4 | 0.2 | 0.4 | 0.5 |

TABLE 4

|  | Ex. 31 | Ex. 32 | Ex. 33 | Ex. 34 | Ex. 35 | Ex. 36 | Ex. 37 | Ex. 38 |
|---|---|---|---|---|---|---|---|---|
| $SiO_2$ (mass %) | 60 | 71 | 70.1 | 58.1 | 61 | 72 | 57 | 69.9 |
| $Al_2O_3$ (mass %) | 7 | 1 | 1 | 10 | 4.7 | 1 | 7 | 3.69 |
| $Na_2O$ (mass %) | 5 | 9 | 11.5 | 12.5 | 8.2 | 13.6 | 5 | 12.16 |
| $K_2O$ (mass %) | 1 | 0 | 0 | 0 | 0 | 0.06 | 6 | 2.8 |
| CaO (mass %) | 0 | 9.8 | 8.5 | 10.2 | 11 | 10.3 | 5 | 5.2 |
| MgO (mass %) | 0 | 5.9 | 3 | 9.2 | 6.8 | 2.43 | 2 | 2.6 |
| SrO (mass %) | 12 | 1.6 | 3.6 | 0 | 0 | 0 | 7 | 0 |
| BaO (mass %) | 15 | 1.7 | 2 | 0 | 8.3 | 0 | 8 | 2 |
| $ZrO_2$ (mass %) | 0 | 0 | 0 | 0 | 0 | 0 | 3 | 0 |
| $B_2O_3$ (mass %) | 0 | 0 | 0 | 0 | 0 | 0 | 0 | 0 |
| $Li_2O$ (mass %) | 0 | 0 | 0 | 0 | 0 | 0 | 0 | 0 |
| $Fe_2O_3$ (mass ppm) | 30 | 30 | 30 | 30 | 30 | 30 | 30 | 30 |
| $CeO_2$ (mass ppm) | 250 | 250 | 250 | 250 | 250 | 250 | 250 | 250 |
| B_RO | 3864 | 1826 | 1811.2 | 1608.8 | 2830 | 1185.52 | 2765 | 998.4 |
| Fe-redox (%) | 8 | 13 | 13 | 24 | 13 | 26 | 11 | 32 |
| Δ% T@400 nm |  |  |  |  |  |  |  |  |
| 450 nm % T@5 cm | 90 | 90 | 90 | 90 | 90 | 90 | 90 | 90 |
| 520 nm % T@5 cm | 91 | 91 | 91 | 91 | 91 | 91 | 91 | 91 |
| 700 nm % T@5 cm | 90 | 89 | 89 | 88 | 89 | 88 | 90 | 87 |
| Ce3+/Ce4+ | 0.4 | 0.6 | 0.5 | 0.9 | 0.5 | 2 | 0.3 | 2.8 |

Embodiment 3

In Tables 5 and 6, the glass composition (unit: mass %) of each of Examples 39 to 57, the content (unit: ppm) of total iron oxide (t-$Fe_2O_3$) in terms of $Fe_2O_3$ as the content of iron in the glass, the content (unit: ppm) of cerium oxide in terms of $CeO_2$, (t-$CeO_2$)/(t-$Fe_2O_3$), the total ($I_{na(II)}$) of intensities of two light absorption peaks derived from $Ce^{3+}$, the redox of iron (Fe-redox) and the parameter $B_{RO}$ (represented as B_RO in the tables) calculated by the left side (64×[MgO]+100×[CaO]+127×[SrO]+156×[BaO]) of formula (3) are shown, and the change Δ % T@400 nm in the transmittance at a wavelength of 400 nm and an optical path length of 1 mm before and after irradiation of these glass samples with a high-pressure mercury lamp at an illuminance of 45 mW/cm² for 30 seconds, the transmittance (%) at an optical path length of 5 cm at wavelengths of 450 nm, 520 nm and 700 nm are shown. Although not described in the tables, each glass contains 6.0 ppm of $MnO_2$, 0.5 ppm of NiO and 0.6 ppm of $Cr_2O_3$.

In the tables, Examples 39 to 54 are Working Examples, and Examples 55 to 57 are Comparative Examples.

In the glass of Examples, the basicity of the alkaline earth metal oxides in the glass is controlled depending on the iron amount contained in the glass, thereby controlling the contents and ratio of cerium oxide and iron oxide and the like in the glass composition, in a state where a smaller amount of $CeO_2$ can effectively work as the oxidizing agent. Accordingly, the redox of the glass is controlled low even in a small amount of cerium oxide compared to Comparative Examples to realize the high internal transmittance, and at the same time, it is also realized to suppress the change in the transmittance due to the solarization to 1.5% or less.

In Table 5 and Table 6, (t-$Fe_2O_3$) corresponds to $Fe_2O_3$ in the tables, and (t-$CeO_2$) corresponds to $CeO_2$ in the tables.

TABLE 5

|  | Ex. 39 | Ex. 40 | Ex. 41 | Ex. 42 | Ex. 43 | Ex. 44 | Ex. 45 | Ex. 46 | Ex. 47 | Ex. 48 |
|---|---|---|---|---|---|---|---|---|---|---|
| $SiO_2$ (mass %) | 69.7 | 69.7 | 69.7 | 69.7 | 69.7 | 69.7 | 69.7 | 69.7 | 69.7 | 69.7 |
| $Al_2O_3$ (mass %) | 3 | 3 | 3 | 3 | 3 | 3 | 3 | 3 | 3 | 3 |
| $Na_2O$ (mass %) | 11 | 11 | 11 | 11 | 11 | 11 | 11 | 11 | 11 | 11 |
| $K_2O$ (mass %) | 0 | 0 | 0 | 0 | 0 | 0 | 0 | 0 | 0 | 0 |
| CaO (mass %) | 8 | 8 | 8 | 8 | 8 | 8 | 8 | 8 | 8 | 8 |
| MgO (mass %) | 0 | 0 | 0 | 0 | 0 | 0 | 0 | 0 | 0 | 0 |
| SrO (mass %) | 4 | 4 | 4 | 4 | 4 | 4 | 4 | 4 | 4 | 4 |
| BaO (mass %) | 4 | 4 | 4 | 4 | 4 | 4 | 4 | 4 | 4 | 4 |
| $ZrO_2$ (mass %) | 0 | 0 | 0 | 0 | 0 | 0 | 0 | 0 | 0 | 0 |
| $B_2O_3$ (mass %) | 0 | 0 | 0 | 0 | 0 | 0 | 0 | 0 | 0 | 0 |
| $Li_2O$ (mass %) | 0 | 0 | 0 | 0 | 0 | 0 | 0 | 0 | 0 | 0 |
| $Fe_2O_3$ (mass ppm) | 30 | 38 | 35 | 35 | 32 | 33 | 29 | 25 | 20 | 1 |
| $CeO_2$ (mass ppm) | 250 | 500 | 75 | 250 | 200 | 350 | 250 | 120 | 900 | 40 |
| $CeO_2/Fe_2O_3$ | 8.3 | 13.2 | 2.1 | 7.1 | 6.3 | 10.6 | 8.6 | 4.8 | 45.0 | 40.0 |
| Ina(II) | 2.4 | 4.6 | 0.8 | 2.5 | 2.1 | 3.3 | 0.2 |  |  |  |
| Fe-Redox (%) | 15 | 5.3 | 19.1 | 13.3 | 12.8 | 7 | 2.8 | 10 | 2.5 | 4.5 |
| Δ% T@400 nm | −0.5 | −1.0 | −0.2 | −0.6 | −0.5 | −0.8 | −0.3 |  |  |  |

TABLE 5-continued

|  | Ex. 39 | Ex. 40 | Ex. 41 | Ex. 42 | Ex. 43 | Ex. 44 | Ex. 45 | Ex. 46 | Ex. 47 | Ex. 48 |
| --- | --- | --- | --- | --- | --- | --- | --- | --- | --- | --- |
| 450 nm % T@5 cm | 90 | 89 | 90 | 89 | 89 | 89 | 90 | 90 | 90 | 90 |
| 520 nm % T@5 cm | 91 | 90 | 91 | 91 | 91 | 91 | 91 | 91 | 91 | 91 |
| 700 nm % T@5 cm | 89 | 90 | 88 | 89 | 89 | 90 | 91 | 90 | 91 | 91 |

TABLE 6

|  | Ex. 49 | Ex. 50 | Ex. 51 | Ex. 52 | Ex. 53 | Ex. 54 | Ex. 55 | Ex. 56 | Ex. 57 |
| --- | --- | --- | --- | --- | --- | --- | --- | --- | --- |
| $SiO_2$ (mass %) | 69.7 | 69.7 | 69.7 | 69.7 | 69.7 | 69.7 | 69.7 | 69.7 | 69.7 |
| $Al_2O_3$ (mass %) | 3 | 3 | 3 | 3 | 3 | 3 | 3 | 3 | 3 |
| $Na_2O$ (mass %) | 11 | 11 | 11 | 11 | 11 | 11 | 11 | 11 | 11 |
| $K_2O$ (mass %) | 0 | 0 | 0 | 0 | 0 | 0 | 0 | 0 | 0 |
| CaO (mass %) | 8 | 8 | 8 | 8 | 8 | 8 | 8 | 8 | 8 |
| MgO (mass %) | 0 | 0 | 0 | 0 | 0 | 0 | 0 | 0 | 0 |
| SrO (mass %) | 4 | 4 | 4 | 4 | 4 | 4 | 4 | 4 | 4 |
| BaO (mass %) | 4 | 4 | 4 | 4 | 4 | 4 | 4 | 4 | 4 |
| $ZrO_2$ (mass %) | 0 | 0 | 0 | 0 | 0 | 0 | 0 | 0 | 0 |
| $B_2O_3$ (mass %) | 0 | 0 | 0 | 0 | 0 | 0 | 0 | 0 | 0 |
| $Li_2O$ (mass %) | 0 | 0 | 0 | 0 | 0 | 0 | 0 | 0 | 0 |
| $Fe_2O_3$ (mass ppm) | 12 | 50 | 100 | 20 | 10 | 145 | 180 | 75 | 20 |
| $CeO_2$ (mass ppm) | 100 | 250 | 400 | 20 | 10 | 1000 | 200 | 25 | 1000 |
| $CeO_2/Fe_2O_3$ | 8.3 | 5.0 | 4.0 | 1.0 | 1.0 | 6.9 | 1.1 | 0.3 | 50.0 |
| Ina(II) |  |  |  |  |  | 3 | 3.2 | 0.4 | 5.2 |
| Fe-Redox (%) | 11.1 | 13 | 13 | 28 | 28 | 8 | 28 | 34 | 1.8 |
| Δ% T@400 nm |  |  |  |  |  | −1.2 | −0.7 | −0.1 | −1.6 |
| 450 nm % T@5 cm | 90 | 89 | 88 | 90 | 90 | 86 | 88 | 89 | 90 |
| 520 nm % T@5 cm | 91 | 90 | 90 | 91 | 91 | 89 | 90 | 90 | 91 |
| 700 nm % T@5 cm | 90 | 88 | 86 | 89 | 90 | 86 | 74 | 82 | 91 |

Embodiment 4

Based on the glass composition of Example 39, glass was prepared in which the ratio ([CaO]/[RO]) of the CaO amount [CaO] and the total alkaline earth metal oxide amount [RO] (the total amount of CaO, SrO and BaO as the alkaline earth metal oxides) in the glass is changed, and for each glass, intensities of two light absorption peaks caused by $Ce^{3+}$ and two light absorption peaks caused by $Ce^{4+}$ were measured. The relationship of the ratio ([$Ce^{3+}$]/[$Ce^{4+}$]) of the total of intensities of two light absorption peaks caused by $Ce^{3+}$ and the total of intensities of two light absorption peaks caused by $Ce^{4+}$ and the ratio ([CaO]/[RO]) is shown as FIG. 1.

Figure 1:
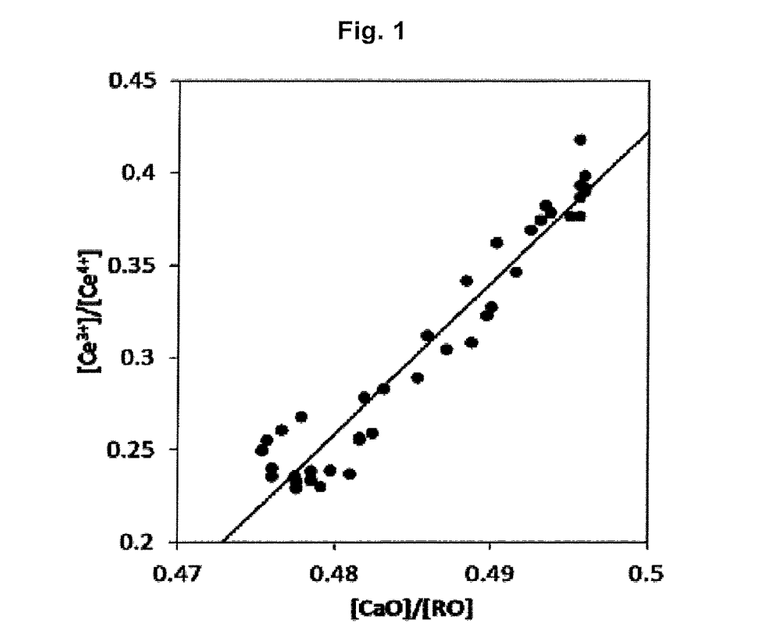
FIG. 1 is a graph obtained by plotting the ratio ($[Ce^{3+}]/[Ce^{4+}]$) of the total of intensities of two light absorption peaks caused by $Ce^{3+}$ and the total of intensities of two light absorption peaks caused by $Ce^{4+}$, in the glass of the present invention, when the ratio ($[CaO]/[RO]$) of the CaO amount $[CaO]$ and the total alkaline earth metal oxide amount $[RO]$ in the glass is changed.

From this FIG. 1, [$Ce^{3+}$]/[$Ce^{4+}$] can be decreased to 0.4 or less to increase the ratio of $Ce^{3+}$ by decreasing the content of CaO having higher oxidizing properties among the alkaline earth metal oxides (for example, decreasing the range of [CaO]/[RO] to 0.5 or less). It is therefore considered that transfer of oxygen from a Ce ion to a Fe ion has effectively proceeded, and the effect of cerium oxide as the oxidizing agent can be made more effective. In addition, for example, it is also possible to decrease [$Ce^{3+}$]/[$Ce^{4+}$] from 0.4 to 0.25 by decreasing [CaO]/[RO] from 0.5 to 0.48 by 2.0%.

Embodiment 5

Figure 2:
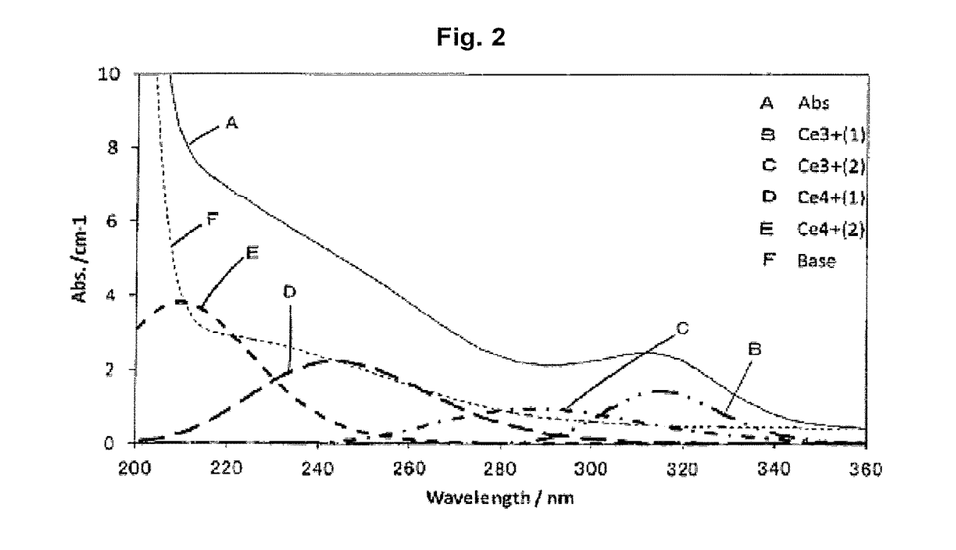
FIG. 2 is a graph obtained by plotting an example (Abs. in the figure) of a light absorption spectrum within a range of wavelengths from 200 nm to 360 nm, and examples of light absorption peak fittings caused by $Ce^{3+}$ and $Ce^{4+}$ in the light absorption spectra, of glass in the present invention.

For the glass of Example 39, a light absorption spectrum within a range of wavelengths from 200 nm to 360 nm was determined, and two light absorption spectra caused by $Ce^{3+}$ and two light absorption spectra cause by $Ce^{4+}$ were determined. The relationship of the respective light absorption spectra is shown as FIG. 2. In FIG. 2, the solid line A described as Abs is the light absorption spectrum in the glass of Example 39, and the dotted line F described as Base is a light absorption spectrum of glass prepared so that the matrix composition, the total iron amount and the redox of iron are the same as in Example 39 without addition of $CeO_2$. Furthermore, in FIG. 2, of the two light absorption spectra caused by $Ce^{3+}$, one (1) having a peak on the longer wavelength side is indicated as B, and the other (2) is indicated as C. Of the two light absorption spectra caused by $Ce^{4+}$, one (1) having a peak on the longer wavelength side is indicated as D, and the other (2) is indicated as E.

From this FIG. 2, the total ($I_{na(II)}=A_{Ce3+(1)}+A_{Ce3+(2)}$) of the two light absorption peaks (Abs./cm$^{-1}$) near a wavelength of 302 nm and a wavelength of 318 nm caused by $Ce^{3+}$ in the glass can be controlled to 5.0 cm$^{-1}$ or less. It is therefore understood that the influence of the solarization of the glass can be reduced.

Embodiment 6

In Table 7, the glass composition (unit: mass %) of each of Examples 58 to 66, the content (unit: ppm) of total iron oxide (t-$Fe_2O_3$) in terms of $Fe_2O_3$ as the content of iron in the glass, the content (unit: ppm) of cerium oxide in terms of $CeO_2$, the content (unit: ppm) of manganese oxide in terms of $MnO_2$, the redox of iron (Fe-redox) and the parameter $B_{RO}$ (represented as B_RO in the tables) calculated by the left side (64×[MgO]+100×[CaO]+127×[SrO]+156×[BaO]) of formula (3) are shown, and the change amount Δ % T@400 nm in the transmittance at a wavelength of 400 nm and an optical path length of 1 mm before and after irradiation of these glass samples with a high-pressure mercury lamp at an illuminance of 45 mW/cm$^2$ for 30 seconds, the change amount Δ % T@630 nm in the transmittance at a wavelength of 630 nm and an optical path length of 50 mm before and after irradiation of these glass samples with a white LED at an illuminance of 1,000,000 lux for 1,000 hours, and the transmittance (%) at an optical path length of 5 cm at wavelengths of 450 nm, 520 nm and 700 nm are shown. The white LED used herein for irradiation emits light within a range of wavelengths from 390 to 800 nm, and has a peak wavelength of light emission of 446 nm and a color temperature of 6,500 K. In the table, Examples 58 to 63 are Working Examples, and Examples 64 to 66 are Comparative Examples. In the compositions of Working Examples, the basicity of the alkaline earth metal oxides in the glass is controlled so as to satisfy $80 \leq B_{RO} \leq 2,500$. It is understood that the low redox of iron can be realized. Furthermore, in all the compositions of Working Examples, the total iron oxide amount is 80 ppm or less, and the redox of iron is low. Accordingly, they have a high transmittance at visible light. In addition, in the compositions of Working Examples, the content of total manganese oxide is within a range of 0.01 to 5 ppm, and the ratio of total cerium oxide and total iron oxide and the ratio of total manganese oxide and total iron oxide are proper, so that the solarization is suppressed.

In Table 7, (t-$Fe_2O_3$) corresponds to $Fe_2O_3$ in the table, (t-$CeO_2$) corresponds to $CeO_2$ in the table and (t-$MnO_2$) corresponds to $MnO_2$ in the Table.

particular, it is suitable for architectural interior and exterior applications, solar cell cover glass and substrate glass applications, exterior applications of various electronic devices and light source applications of electronic devices, and for example, suitable for light guide bodies of edge light type surface light emitter devices. In addition, it is suitable for light guide bodies coping with increasing size of screens of liquid crystal display devices such as liquid crystal televisions.

The entire contents of the description, claims, drawings and abstract of Japanese Patent Application No. 2015-077046 filed on Apr. 3, 2015 are incorporated herein by reference as the disclosure of the present invention.

The invention claimed is:
1. A glass article comprising a glass comprising, in terms of mass % or mass ppm on the basis of the following oxides, 50 to 80% of $SiO_2$, 0 to 10% of $K_2O$, 1 to 80 ppm of total iron oxide (t-$Fe_2O_3$) in terms of $Fe_2O_3$, 0 to 10 ppm of ferrous iron ($Fe^{2+}$) in terms of $Fe_2O_3$, 0.01 to 5 ppm of total manganese oxide (t-$MnO_2$) in terms of $MnO_2$, and 1 to 35%

TABLE 7

| | Ex. 58 | Ex. 59 | Ex. 60 | Ex. 61 | Ex. 62 | Ex. 63 | Ex. 64 | Ex. 65 | Ex. 66 |
|---|---|---|---|---|---|---|---|---|---|
| $SiO_2$ (mass %) | 69.8 | 69.8 | 69.7 | 62.2 | 67 | 61.9 | 69.7 | 57 | 69.8 |
| $Al_2O_3$ (mass %) | 3 | 3 | 3 | 19.4 | 12 | 19 | 3 | 7 | 3 |
| $Na_2O$ (mass %) | 11 | 11 | 11 | 12.9 | 8.5 | 0 | 11 | 5 | 11 |
| $K_2O$ (mass %) | 0 | 0 | 0 | 0.2 | 0 | 0 | 0 | 6 | 0 |
| CaO (mass %) | 8 | 8 | 8 | 0 | 0 | 2.8 | 8 | 5 | 8 |
| MgO (mass %) | 0 | 0 | 0 | 1.4 | 1.5 | 0 | 0 | 2 | 0 |
| SrO (mass %) | 4 | 4 | 4 | 0 | 3 | 4.6 | 4 | 7 | 4 |
| BaO (mass %) | 4 | 4 | 4 | 0 | 0.1 | 9 | 4 | 8 | 4 |
| $ZrO_2$ (mass %) | 0 | 0 | 0 | 0 | 0 | 0 | 0 | 3 | 0 |
| $B_2O_3$ (mass %) | 0 | 0 | 0 | 3.7 | 7.8 | 2.6 | 0 | 0 | 0 |
| $Li_2O$ (mass %) | 0 | 0 | 0 | 0 | 0 | 0 | 0 | 0 | 0 |
| $Fe_2O_3$ (mass ppm) | 14 | 14 | 75 | 15 | 11 | 29 | 75 | 50 | 7 |
| $CeO_2$ (mass ppm) | 0 | 0 | 25 | 0 | 0 | 0 | 25 | 0 | 0 |
| $CeO_2/Fe_2O_3$ | 0 | 0 | 0.3 | 0 | 0 | 0 | 0.3 | 0 | 0 |
| B_RO | 1932 | 1932 | 1932 | 89.6 | 492.6 | 2268.2 | 1932 | 2765 | 1932 |
| $MnO_2$ (mass ppm) | 1.6 | 4.2 | 0.8 | 1.1 | 0.3 | 1.6 | 6 | 3 | 4.5 |
| NiO (mass ppm) | 0.4 | 0.4 | 0.5 | 0.4 | 0.2 | 0.4 | 0.5 | 0.5 | 0.4 |
| $Cr_2O_3$ (mass ppm) | 0.4 | 0.4 | 0.6 | 0.4 | 0.4 | 0.4 | 0.6 | 0.6 | 0.5 |
| $MnO_2/Fe_2O_3$ | 0.11 | 0.3 | 0.01 | 0.07 | 0.03 | 0.06 | 0.08 | 0.06 | 0.64 |
| Fe-Redox (%) | 10 | 10 | 20 | 11 | 22 | 25 | 20 | 33 | 10 |
| Δ% T@400 nm | 0 | −0.1 | −0.1 | 0 | 0 | 0 | −0.1 | −0.1 | −0.1 |
| Δ% T@630 nm | −0.7 | −2 | −0.4 | −0.5 | −0.2 | −0.8 | −3.6 | −1.9 | −3.2 |
| 450 nm % T@5 cm | 90 | 90 | 89 | 90 | 91 | 90 | 89 | 89 | 90 |
| 520 nm % T@5 cm | 91 | 91 | 90 | 91 | 92 | 91 | 90 | 90 | 91 |
| 700 nm % T@5 cm | 91 | 91 | 86 | 91 | 92 | 89 | 86 | 84 | 91 |

INDUSTRIAL APPLICABILITY

According to the present invention, the glass article having a high transmittance, particularly the glass article having such a high transmittance that the average internal transmittance in the visible light region at an optical path length of 20 cm is 80% or more and having an internal transmittance spectrum of the glass article more flattened, while suppressing the discoloration and the solarization of the glass, can be provided by controlling the contents of cerium oxide and iron oxide in the glass composition within the optimum range, further controlling the contents of manganese oxide and iron oxide in the glass composition within the optimum range, and controlling the basicity of the alkaline earth metal oxides in the glass composition depending on the iron amount contained in the glass.

The glass article of the present invention can be suitably used for one desired to have a high transmittance. In of at least one selected from the group consisting of alkaline earth metal oxides of MgO, CaO, SrO and BaO, in a total amount thereof, wherein, in the glass, redox of iron represented by the following formula (1) is from 0 to 30%:

(Content of ferrous iron ($Fe^{2+}$) in terms of $Fe_2O_3$)/
[(total content ($Fe^{2+}+Fe^{3+}$) of ferrous iron
($Fe^{2+}$) and ferric iron ($Fe^{3+}$) in terms of $Fe_2O_3$]    formula (1), and the glass satisfies relational formulae of the following formulae (5), (6) and (8):

$$[t\text{-}CeO_2]/[t\text{-}Fe_2O_3] < 1 \qquad \text{formula (5)},$$

$$0.001 \leq [t\text{-}MnO_2]/[t\text{-}Fe_2O_3] \leq 0.5 \qquad \text{formula (6)},$$

$$80 \leq (64 \times [MgO] + 100 \times [CaO] + 127 \times [SrO] + 156 \times [BaO]) \leq 2500 \qquad \text{formula (8)},$$

wherein, in formulae (5), (6) and (8), [t-$CeO_2$] is the content (mass ppm) of the total cerium oxide, [t-$MnO_2$]

is the content (mass ppm) of the total manganese oxide, [t-Fe$_2$O$_3$] is the content (mass ppm) of the total iron oxide, [MgO] is the content (mass %) of MgO, [CaO] is the content (mass %) of CaO, [SrO] is the content (mass %) of SrO, and [BaO] is the content (mass %) of BaO.

2. The glass article according to claim 1, wherein the glass comprises, in terms of mass ppm, 0 to 4 ppm of ferrous iron (Fe$^{2+}$) in terms of Fe$_2$O$_3$.

3. The glass article according to claim 1, wherein the glass contains substantially none of B$_2$O$_3$.

4. The glass article according to claim 1, wherein the glass further comprises, in terms of mass %, more than 0% and 0.5% or less of SO$_3$.

5. The glass article according to claim 1, wherein the glass further comprises, in terms of mass %, 0 to 1% of SnO$_2$.

6. The glass article according to claim 1, wherein the glass has 85% or more of a minimum value of the transmittance within a range of wavelengths from 400 to 700 nm under conditions of an effective optical path length of 50 mm, and the difference between a maximum value and the minimum value of the transmittance is 3.8% or less.

7. The glass article according to claim 1, wherein the glass is a glass plate at least one side of which has a length of 200 cm or less and which has a thickness of 0.5 mm or more.

8. The glass article according to claim 1, wherein at least one of end faces of the glass plate is polished.

* * * * *

UNITED STATES PATENT AND TRADEMARK OFFICE
CERTIFICATE OF CORRECTION

PATENT NO. : 10,435,327 B2
APPLICATION NO. : 15/722611
DATED : October 8, 2019
INVENTOR(S) : Seiji Inaba et al.

It is certified that error appears in the above-identified patent and that said Letters Patent is hereby corrected as shown below:

On the Title Page

Item (71), the applicant is incorrect. Item (71) should read:
-- (71) AGC Inc., Chiyoda-ku (JP) --

Signed and Sealed this
Fourteenth Day of July, 2020

Andrei Iancu
*Director of the United States Patent and Trademark Office*